US012560947B2

(12) United States Patent
Zhang et al.

(10) Patent No.: US 12,560,947 B2
(45) Date of Patent: Feb. 24, 2026

(54) SYSTEMS AND METHODS FOR ADAPTIVE ATTITUDE CONTROL FOR FOLDABLE QUADROTORS

(71) Applicants: Wenlong Zhang, Chandler, AZ (US); Karishma Patnaik, Tempe, AZ (US)

(72) Inventors: Wenlong Zhang, Chandler, AZ (US); Karishma Patnaik, Tempe, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 0 days.

(21) Appl. No.: 18/745,804

(22) Filed: Jun. 17, 2024

(65) Prior Publication Data

US 2024/0419186 A1 Dec. 19, 2024

Related U.S. Application Data

(60) Provisional application No. 63/508,468, filed on Jun. 15, 2023.

(51) Int. Cl.
| | |
|---|---|
| G05D 1/495 | (2024.01) |
| G05D 1/646 | (2024.01) |
| G05D 109/25 | (2024.01) |

(52) U.S. Cl.
CPC ............. G05D 1/495 (2024.01); G05D 1/646 (2024.01); G05D 2109/25 (2024.01)

(58) Field of Classification Search
CPC .... G05D 1/495; G05D 1/646; G05D 2109/25; G05D 1/644; G05D 2107/50; G05D 2109/254
See application file for complete search history.

(56) References Cited

U.S. PATENT DOCUMENTS

| | | | |
|---|---|---|---|
| 2024/0019873 A1* | 1/2024 | Li | G05D 1/0808 |
| 2024/0199219 A1* | 6/2024 | Yan | G05D 1/49 |
| 2025/0021109 A1* | 1/2025 | Zhang | G05D 1/646 |

OTHER PUBLICATIONS

A. Fabris, K. Kleber, D. Falanga and D. Scaramuzza, "Geometry-aware Compensation Scheme for Morphing Drones," 2021 IEEE International Conference on Robotics and Automation (ICRA), Xi'an, China, 2021, pp. 592-598, doi: 10.1109/ICRA48506.2021.9561774. (Year: 2021).*
Patnaik, K. et al., "Towards reconfigurable and flexible multirotors," International Journal of Intelligent Robotics and Applications, vol. 5, No. 3, Aug. 30, 2021, pp. 365-380.

(Continued)

*Primary Examiner* — Thomas Ingram
(74) *Attorney, Agent, or Firm* — Polsinelli PC

(57) ABSTRACT

A vehicle control framework enables improved attitude tracking and mode switching of a vehicle by modeling the vehicle as a switched system, where the vehicle is operable for changing a geometric configuration during flight. The vehicle control framework implements a control law that accommodates modeling uncertainties and unknown external disturbances. The vehicle also enforces a switching time constrained by a minimum dwell time which can be adaptively updated based on attitude errors.

20 Claims, 18 Drawing Sheets

(56)         References Cited

OTHER PUBLICATIONS

Patnaik, K. et al., "Design and Control of Squeeze: A Spring-augmented QUadrotor for interactions with the Enviroment to squeeZE-and-fly," IEEE/RS J International Conference on Intelligent Robotics and Systems (IROS), Oct. 25-29, 2020, pp. 1364-1370.

Patnaik, K. et al., "Collision rRcovery Control of a Foldable Quadrotor," in 2021 IEEE/ASME International Conference on Advanced Intelligent Mechatronics (AIM), 2021, pp. 418-423.

Falanga, D. et al., "The Foldable Drone: A Morphing Quadrotor that Can Squeeze and fly," IEEE Robotics and Automation Letterst, vol. 4, No. 2, Apr. 2019, pp. 209-216.

Fabris, A. et al., "Geometry-aware Compensation Scheme for Morphing Drones," in 2021 IEEE International Conference on Robotics and Automation, May 31-Jun. 4, 2021, pp. 592-598.

Zhao, N. et al., "Comparative Validation Study on Bioinspired Morphology-Adaptation Flight Performance of a Morphing Quadrotor," IEEE Robot Automation Letter, vol. 6, No. 3, Jul. 2021, pp. 5145-5152.

Lew, T. et al., "Contact inertial Odometry: Collisions are your friends," Robotics Research, Feb. 17, 2022, pp. 938-958.

Derrouaoui, S. H. et al., "Nonlinear Robust Control of a New Reconfigurable Unmanned Aerial Vehicle," Robotics, vol. 10, No. 2, May 23, 2021, pp. 1-13.

Slotine, J-J. E. et al., Applied Nonlinear Control, vol. 199. Prentice Hall Englewood Cliffs, 1991, pp. 476.

Bucki, N. et al., "Design and Control of a Midair-Reconfigurable Quadcopter Using Unactuated Hinges," IEEE Transactions on Robotics, vol. 39, No. 1, Feb. 2023, pp. 539-557.

Papadimitriou. A. et al., "Geometry Aware NMPC Scheme for Morphing Quadrotor Navigation in Restricted Entrances," in 2021 European Control Conference (ECC), Jun. 29-Jul. 2, 2021, pp. 1597-1603.

Papadimitriou. A. et al., "Switching Model Predictive Control for Online Structural Reformations of a Foldable Quadrotor," in 46th Annu Conf IEEE Ind Electronics Soc, pp. 682-687, IEEE, 2020.

Derrouaoui, S. H. et al., "Adaptive integral backstepping control of a reconfigurable quadrotor with variable parameters' estimation," J Systems and Control Engineering, vol. 236(7), Feb. 25, 2022, pp. 1294-1309.

Butt, J. M. et al, "Adaptive Flight Stabilization Framework for a Planar 4r-Foldable Quadrotor: Utilizing Morphing to Navigate in Confined Environments," in 2022 American Control Conference, Jun. 8-10, 2022, pp. 1-7.

Yang, D. et al., "Design, Planning, and Control of an Origami-inspired Foldable Quadrotor," in American Control Conference (ACC) Jul. 10-12, 2019, pp. 2551-2556.

Liberzon, D., Switching in System Control, vol. 190. Springer, 2003, "Appendix," in https://arxiv.org/abs/2209.08676. 119 pages.

Lee, T. et al., "A Natural adaptive Control Law for Robot Manipulators," in 2018 IEEE/RSJ Intelligent Robots and Systems (IROS), Oct. 1-5, 2018, pp. 8628-8635.

Lee, T. et al., "Robust Adaptive Attitude Tracking on SD(3) with an application to a Auadrotor UAV," IEEE Transaction on Control Systems Technology, vol. 21, No. 5, Sep. 2013, pp. 1924-1930.

Lee, T. et al., "Geometric Tracking Control of a Quadrotor UAV on SE (3)," in 2010 IEEE Conference on Decision and Control, Dec. 15-17, 2010, pp. 5420-5425.

Lopez, B. T. et al., "Sliding on Manifolds: Geometric Attitude Control with Quaternions," in 2021 IEEE International Conference on Robotics and Automation, May 31-Jun. 4, 2021, pp. 11140-11146.

Tsakalis, K., "Some Background on Adaptive Estimation," http://tsakalis.faculty.asu.edu/notes/e303.pdf, Jan. 1, 1998, 17 pages.

Ioannou, P. A. et al., "Robust Adaptive Control," Courier Corporation, 2012, 840 pages.

* cited by examiner (a) Tracking of angular velocity (b) Control effort (a) Angular velocity tracking (b) Errors in $e_R$ (c) Inertia estimates (kg-m$^2$)

(d) Control effort (a) Angular velocity tracking (b) Errors in $e_R$ (c) Control effort

SYSTEMS AND METHODS FOR ADAPTIVE ATTITUDE CONTROL FOR FOLDABLE QUADROTORS

CROSS REFERENCE TO RELATED APPLICATIONS

This is a non-provisional application that claims benefit to U.S. Provisional Application Ser. No. 63/508,468, filed on Jun. 15, 2023, which is herein incorporated by reference in its entirety.

FIELD

The present disclosure generally relates to unmanned aerial vehicles, and in particular, to a system and associated method for adaptive attitude control for foldable quadrotors.

BACKGROUND

Foldable quadrotors (FQrs) have created a paradigm shift in the design of multirotor aerial vehicles for flying through small openings and cluttered spaces. While there is ample research demonstrating the mechanical feasibility of the foldable designs, limited literature exists on the analysis of the low-level flight controller and the effects of inflight configuration switching.

It is with these observations in mind, among others, that various aspects of the present disclosure were conceived and developed.

BRIEF DESCRIPTION OF THE DRAWINGS

FIG. 6D shows control effort;

Corresponding reference characters indicate corresponding elements among the view of the drawings. The headings used in the figures do not limit the scope of the claims.

DETAILED DESCRIPTION

In recent years, quadrotors have transcended conventional designs, emphasizing more on foldable and reconfigurable bodies. The state of the art still focuses on the mechanical feasibility of such designs with limited discussions on the tracking performance of the vehicle during configuration switching. The present disclosure first presents a common framework to analyze the attitude errors of a folding quadrotor (FQr) via theory of switched systems. This framework is then employed to investigate the attitude tracking performance for two case scenarios: one with a conventional geometric controller for precisely-known system dynamics; and second, with a proposed morphology-aware adaptive controller that accounts for any modeling uncertainties and disturbances. Finally, the desired switching requirements from the stability analysis are accommodated by exploiting the trajectory planner to obtain superior tracking performance while switching. Simulation results are presented that validate the proposed control and planning framework for a foldable quadrotor's flight through a passageway.

I. Introduction

The low-level flight control for a FQr is challenging due to parameter-varying dynamics corresponding to its various configurations. Also, failure to account for any modeling uncertainties (such as inertia or aerodynamics) can further deteriorate the tracking performance. In this context, robust controllers have been explored to obtain the desired tracking performance by considering bounded model uncertainties. The uncertainty bounds for these systems are generally held constant across the various configurations and may lead to chattering in the control inputs.

Figure 1A:
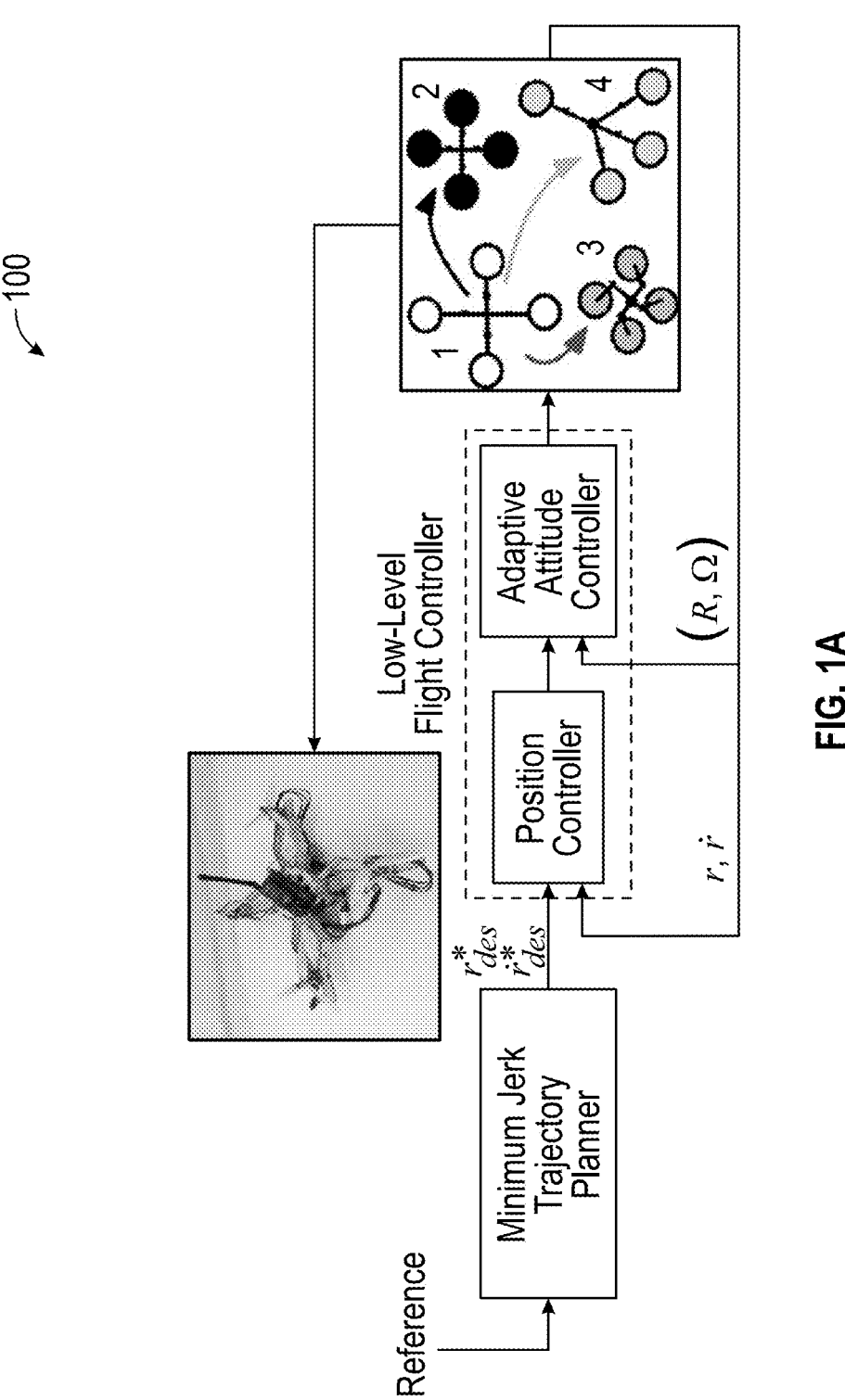
FIGS. 1A and 1B are a pair of simplified diagrams showing a foldable quadrotor switched system including an adaptive attitude controller.

Alternatively, adaptive controllers that switch between various operating configurations have also been explored, which fall into the broad category of switched systems (see the quadrotor and associated computer-implemented controllers shown in FIG. 1A). For example, researchers have synthesized different LQR controllers for different configurations and the corresponding changes in vehicle dynamics. Other approaches employing switched model predictive and back stepping controllers have also been developed to address the parameter variation during the change in configuration. However, all the aforementioned work assumed precise knowledge of vehicle model. In one work, an adaptive controller was developed with online parameter estimation, however the rate of change of inertia was assumed negligible, which is not true for switched FQr systems. Furthermore, existing methods fail to address discontinuities encountered during mode switching. Since the goal of the foldable chassis is to ensure that the vehicle flies through narrow constrained spaces safely, it is important to ensure that this transition-induced disturbance is not significant to cause instability or crashes. Therefore, the switching signal should also be planned, for the transition to occur safely, as a function of vehicle state while adhering to geometric constraints.

A novel framework outlined herein models attitude dynamics of FQrs as switched systems. The insights from this analysis are then employed to propose an adaptive controller that applies a parameter estimation framework and with robustness term, which is duly validated in simulations. Three scenarios are considered in this analysis: 1) the simplest case with a precisely-known model, 2) the case with modeling uncertainties in inertia and 3) the case with external disturbances in addition to unknown inertia. Furthermore, the present disclosure outlines a coupled control and motion planning framework for FQrs, by augmenting this attitude controller and a PD-type position controller with a control-aware minimum-jerk trajectory planner to enforce the stability conditions and guarantee safety during switching.

The remainder of this disclosure is organized as follows: Section II describes the problem setup and system overview with the error definitions in Section III. Section IV analyzes the tracking stability for the aforementioned three case scenarios with the proposed controller while Section V describes the control-aware trajectory generation. In Section VI, simulation results are presented that validate the proposed control framework. Section VII outlines additional information about definitions, proofs, and simulation details. Section VIII outlines an example computing device for implementation of computer-implemented aspects of the control framework outlined herein.

II. Problem Statement and System Overview

Let $x=[R, \Omega]^T$ denote the rotation and angular velocity respectively of a foldable quadrotor. Now, consider the following family of systems $\dot{\chi}=f_p(x)$ corresponding to each configuration shown along the right-hand side of FIG. 1A as:

$$\dot{R} = R\hat{\Omega} \tag{1}$$

$$H_p\dot{\Omega} - [H_p\Omega]_\times \Omega = u + \Delta$$

with $p \in \mathcal{P}$ where $\mathcal{P} \subseteq \mathbb{N}$ is the index set and is finite such that $\mathcal{P} = \{1, 2, \ldots, m\}$. To define a switched system generated by the above family, the switching signal is introduced as a piece-wise constant function $\sigma: [0, \infty) \to \mathcal{P}$. It has a finite number of discontinuities and takes a constant value on every interval between two consecutive switching time instants. The role of $\sigma$ is to specify, at each time instant $t$, the index $\sigma(t) \in \mathcal{P}$ of the active subsystem model from the family (1) that the FQr currently follows. The hat map $\hat{\cdot}$: $\mathbb{R}^3 \to SO(3)$ is a symmetric matrix operator defined by the condition that $\hat{x}y=x\times y \ \forall x, y \in \mathbb{R}^3$. The vee map V: $SO(3) \to \mathbb{R}^3$ represents the inverse of the hat map and $[.]_\times$ is the skew symmetric cross product matrix. Further details about the operators are given in Sections VII-B and VII-C. $\Delta \in \mathbb{R}^3$ represents the disturbances and unmodelled dynamics in the attitude dynamics.

Figure 1B:
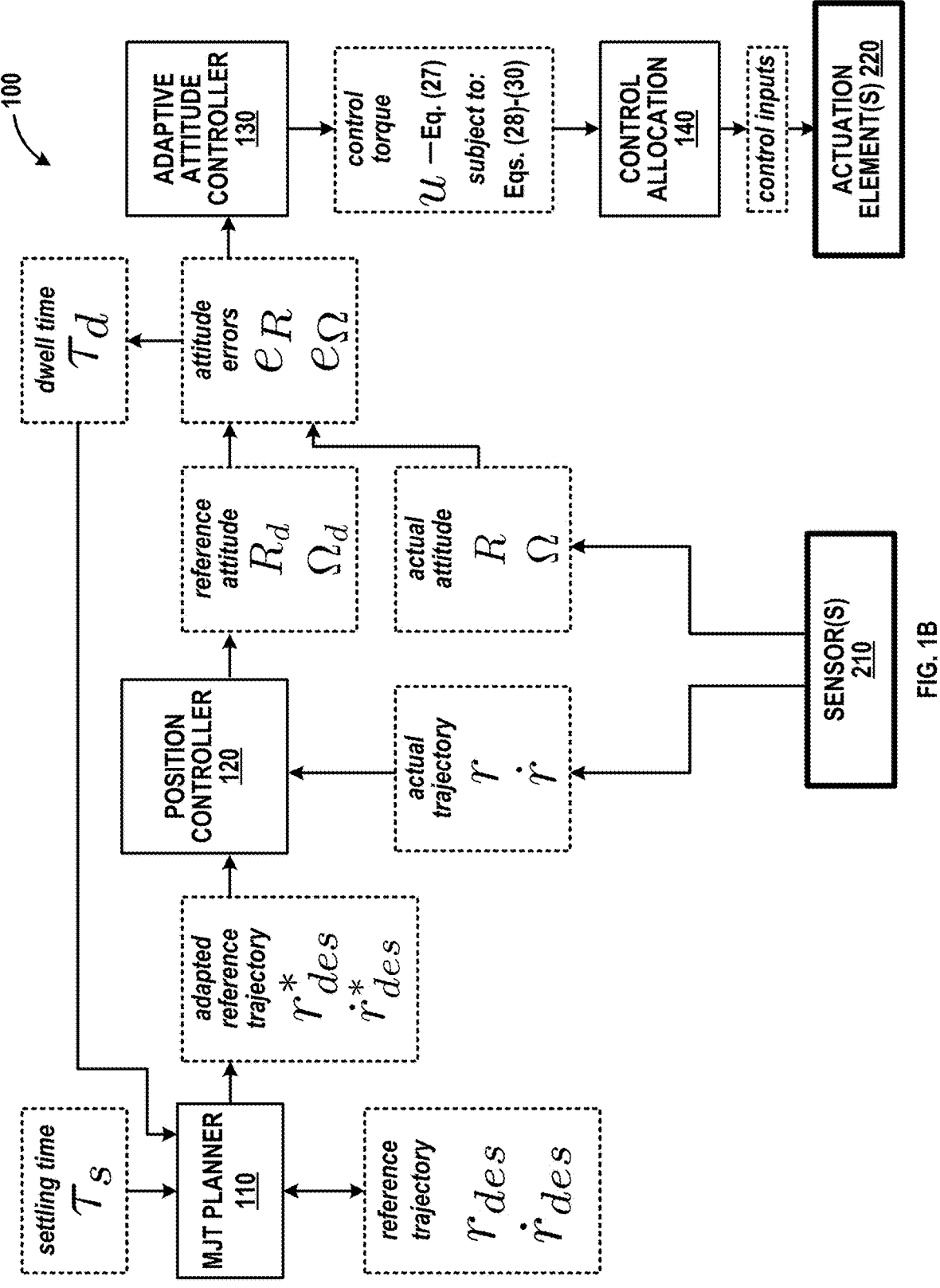
Figure 8:
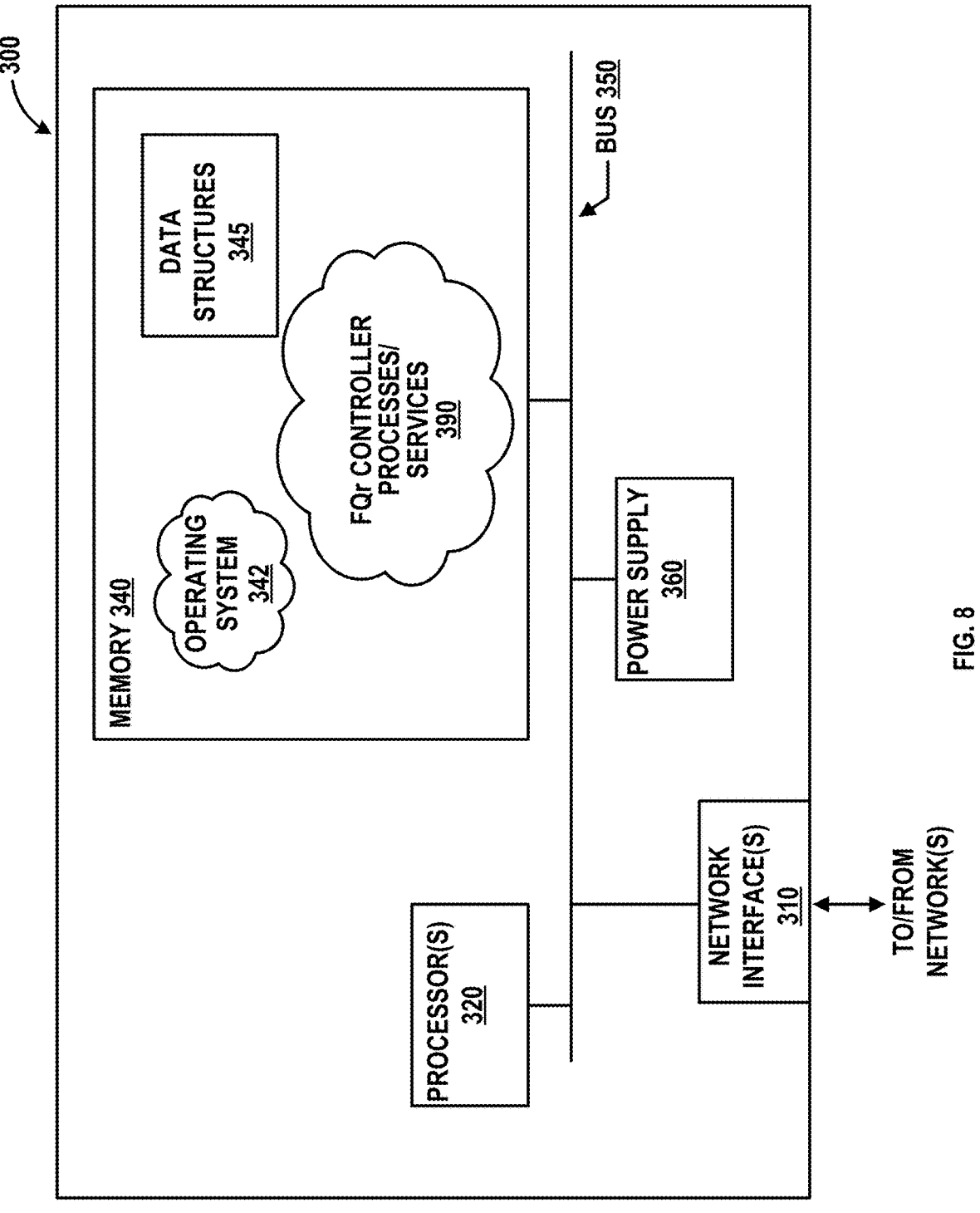
FIG. 8 is a simplified diagram showing an exemplary computing system for implementation of the system of FIGS. 1A and 1B.

FIG. 1B shows a simplified diagram of data flow between various components of the system 100, some of which can be implemented using a computing device (e.g., computing device 300 shown in FIG. 8).

As shown, the system 100 can be a vehicle such as an FQr, and can include a Minimum Jerk Trajectory (MJT) planner 110 in communication with a position controller 120 and an adaptive attitude controller 130. The system 100 can include one or more sensor(s) 210 which can include inertial measurement units (IMUs), as well as one or more actuation element(s) 220 which can include, but are not limited to, motors associated with propellers and motors associated with elements that change or otherwise control a geometric configuration of the vehicle. Importantly, the vehicle is operable for switching between two of a plurality of geometric configurations at a switching time.

The MJT planner 110 generates a reference trajectory associated with a reference attitude for a vehicle, as well as a target position of an entrance of a passageway and a target velocity for the vehicle to travel through the passageway.

The MJT planner 110 can access a settling time associated with attitude tracking stabilization for the vehicle under a geometric configuration of the plurality of geometric configurations.

The position controller 120 can determine a reference attitude based on the reference trajectory provided by the MJT planner. The reference attitude can be passed to the adaptive attitude controller 130, which generates a control torque value to achieve the reference attitude. The control torque value can be applied as input to a control allocation module 140 which translates the control torque value to appropriate actuation signals or control inputs for application to the actuation element(s) 220.

When data is available from sensor(s) 210, (e.g., position) and an attitude (e.g., a set of attitude information that correlate with a current position and attitude of the vehicle) are reported to the system 100. The system 100 determines, based on the set of attitude information obtained from the sensor, an attitude tracking error with respect to the reference attitude. The system 100 can then determine a minimum dwell time that restricts the switching time to accommodate modeling uncertainties associated with switching between geometric configurations. The minimum dwell time can incorporate a percentage or ratio of the attitude tracking error, as discussed herein with respect to Eq. (26).

Based on the minimum dwell time and the attitude tracking settling error, the MJT planner 110 can update the reference trajectory according to Eqs. (31) and (33) outlined herein to reflect an adapted reference trajectory including an adapted reference attitude based on: the minimum dwell time, the settling time associated with attitude tracking stabilization for the vehicle under the geometric configuration of the plurality of geometric configurations, and the reference trajectory.

The reference trajectory also outlines a targeted switching time at which the vehicle may switch to a different geometric configuration in order to maintain stability during switching, especially under modeling uncertainties and external disturbances: a) the vehicle must meet a certain velocity and position before switching; b) the vehicle must remain within a given geometric configuration for longer than the minimum dwell time, which may continually change based on the attitude tracking error; and c) the vehicle must remain within a given geometric configuration for longer than the settling time, which will depend on the geometric configuration as well as properties of the sensors and other components of the vehicle. The adapted reference trajectory can incorporate a target position of an entrance of a passageway where the vehicle is expected to reach over a time interval that is greater than the settling time and the minimum dwell time, as well as a target velocity for the vehicle to travel through the passageway over the time interval that is greater than the settling time and the minimum dwell time.

5

The position controller 120 and adaptive attitude controller 130 can update the reference attitude and control torque value in view of the adapted reference trajectory. Importantly, the adaptive attitude controller 130 determines the control torque value according to a control law outlined in Eqs. (27)-(30) herein. The control law in Eqs. (27)-(30) incorporates a robust control term that accommodates unknown external disturbances that affect attitude control of the vehicle. The robust control term incorporates an augmented tracking error ($e_A$) which incorporates the attitude tracking error and an augmenting constant $c_2$ associated with the geometric configuration, the augmenting constant $c_2$ being selected to ensure that attitude tracking error for each configuration of the vehicle converges to zero.

The system 100 can use the control allocation module 140 to generate an actuation signal for application to one or more actuation elements of the vehicle based on the control torque value, e.g., by providing the control torque value as input to a control allocation matrix associated with the geometric configuration that maps the control torque value to the actuation signal.

When appropriate, the system 100 can generate, based on the adapted reference trajectory, a mode switching signal to transition the vehicle between a first geometric configuration and a second geometric configuration at the switching time, the switching time being selected based on: the minimum dwell time, the settling time, a position of the vehicle in view of the adapted reference trajectory, and a velocity of the vehicle in view of the adapted reference trajectory.

This process repeats as needed during flight by the vehicle. As the vehicle continues its flight, quantities that change and therefore need to be adapted regularly are those which are dependent on the attitude information (rotation R and angular velocity $\Omega$) and/or attitude tracking error (e.g., attitude errors $e_R$ and $e_\Omega$, which are sometimes combined into the augmented tracking error $e_A$) such as those in Eqs. (26)-(31) and (33) as discussed in further detail herein. Additional quantities and matrices that are continually updated based on attitude information and/or attitude error include: matrix Y introduced in Eq. (5) as well as its variations which collect information about angular velocity of the vehicle and are applicable to Eqs. (27) and (28); and inertial parameter estimates h (or $h_p$ pertaining to a $\mathcal{P}$-th geometric configuration) applicable to Eqs. (27) and (28).

Quantities which can remain constant (and which may be dependent on vehicle properties and geometric configurations) include such as the augmenting constant $c_2$ in Eq. (17), elements of first matrix $W_{13}{}^{\mathcal{P}}$ in Eq. (22) and its maximum and minimum eigenvalues, elements of second matrix $W_{23}{}^{\mathcal{P}}$ in Eq. (22) and its maximum and minimum eigenvalues, elements of third matrix $W_{31}{}^{\mathcal{P}}$ in Eq. (25), an upper bound on external disturbances $\delta_R$, as well as positive constants and tuning parameters such as $k_R$, $k_\Omega$, $g_1$, $g_2$, $g_3$, $b_1$, $b_2$ which contribute to various quantities herein including the augmenting constant $c_2$, and the first, second, and third matrices. These values may be approximated through simulation and other methods.

III. Error Definitions

This section describes the definitions of the attitude errors for the tracking problem. Consider the error function, $\Phi$, and attitude errors $e_R$ and $e_\Omega$ defined as follows:

$$\Phi(R, R_d) = \frac{1}{2} tr\left[G\left(I - R_d^T R\right)\right] \qquad (2)$$

6

-continued $$e_R(R, R_d) = \frac{1}{2}\left(G R_d^T R - R^T R_d G\right)^\vee$$

$$e_\Omega(R, \Omega, R_d, \Omega_d) = \Omega - R^T R_d \Omega_d$$

where $G \in \mathbb{R}^{3 \times 3}$ is given by $diag[g_1, g_2, g_3]^T$ for distinct positive constants $g_1$, $g_2$, $g_3 \in \mathbb{R}$. With these definitions, the following statements hold:
1. $\Phi$ is locally positive definite about $R=R_d$
2. the left trivialized derivative of $\Phi$ is given by $e_R$
3. the critical points of $\Phi$ where $e_R=0$ are $\{R_d\} \cup \{R_d \exp(\pi \hat{s})\}$ for $s \in \{e_1, e_2, e_3\}$
4. the bounds on $\Phi$ are given by:

$$b_1 \|e_R(R, R_d)\|^2 \le \Phi(R, R_d) \le b_2 \|e_R(R, R_d)\|^2 \qquad (3)$$

The time derivative of the errors are given by:

$$\frac{d}{dt}\Phi(R, R_d) = e_R \cdot e_\Omega$$

$$\dot{e}_R = \frac{1}{2}\left(R_d^T R \hat{e}_\Omega + \hat{e}_\Omega R^T R_d\right)^\vee \equiv C\left(R_d^T, R\right) e_\Omega$$

with $C\left(R_d^T, R\right) = \frac{1}{2}\left(tr\left[R^T R_d G\right] I - R^T R_d G\right)$ it can also be verified that $C(R_d{}^T, R)$ is bounded by $$\left\|C\left(R_d^T, R\right)\right\| \le \frac{1}{\sqrt{2}} tr[G].$$

Furthermore, $$\dot{e}_\Omega = \dot{\Omega} + \hat{\Omega} R^T R_d \Omega_d - R^T R_d \dot{\Omega}_d = \dot{\Omega} - \alpha_D \qquad (4)$$

where $\alpha_D = R^T R_d \dot{\Omega}_d - \hat{\Omega} R^T R_d \Omega_d$ physically represents the angular acceleration term.

IV. Controller Design and Stability Analysis

For this disclosure, consider the sub-level set $\mathcal{L} = \{R_d, R \in SO(3) | \Phi(R, R_d) < 2\}$ such that the initial attitude error satisfies $\Phi(R(0), R_d(0)) < 2$. Note that this requires that the initial attitude error should be less than 180°. Future extensions of this work will analyze complete low-level flight controller stability over the entire SO(3). This section will first provide the methodology for stability analysis for attitude tracking of FQrs modeled as switched systems. Conditions for switching are also presented such that the overall system retains the tracking performance when the system model and parameter values are precisely known. Next, the present disclosure outlines an adaptive controller which estimates the unknown inertia online, and extends the stability analysis with the adaptive controller. Eqs. (26)-(30) in this section are of particular importance, where Eq. (26) outlines conditions pertaining to the minimum dwell time in view of modeling uncertainties and Eqs. (27)-(30) outline a control law that governs control torque values in view of modeling uncertainties and external disturbances, A. Case with the Precise Model, $\Delta=[0\ 0\ 0]^T$ For this example case scenario, $H_p$ is precisely known for each $p^{th}$ subsystem (i.e., geometric configuration) in (1).

1) Attitude tracking of individual subsystems: The attitude dynamics for an individual subsystem (i.e., geometric configuration) from the switched system of (1) can be rewritten in the form of $H_p \dot{\Omega} - Y_1 h_p = u$ where $Y_1 \in \mathbb{R}^{3\times3}$ and $h_p = [h_{pxx} h_{pyy} h_{pzz} h_{pxy} h_{pxz} h_{pzz}]^T$ is the vector encompassing the unique elements of the moment of inertia tensor.

The control moment in this case can be generated according to (5):

$$u = -k_R e_R - k_\Omega e_\Omega - Y h_p \qquad (5)$$

where $Y = Y_1 - Y_2$ with $H_p \alpha_d \doteq Y_2 h_p$. The exact definitions of $Y_1$ and $Y_2$ are given in Sections VII-D and VII-E respectively.

Proposition 1: For positive constants $k_\Omega$ and $k_R$, if a positive constant $c_1$ is chosen such that:

$$c_1 < \min\left\{ \frac{\sqrt{2k_\Omega}}{tr[G]}, \right.$$
$$\left. \frac{4\sqrt{2}\, k_R k_\Omega (\Lambda_{min}^p)^2}{\sqrt{2}\, k_\Omega^2 \Lambda_{max}^p + 4 k_R (\Lambda_{min}^p)^2 tr[G]}, \sqrt{b_1 k_R \Lambda_{min}^p}, \sqrt{b_2 k_R \Lambda_{max}^p} \right\} \qquad (6)$$

then the attitude tracking dynamics of the individual subsystems, $(e_R, e_\Omega)$, are exponentially stable in the sublevel set $\mathcal{L}$. Moreover, if each subsystem resides in a particular switched state for a minimum dwell-time given by $\tau_d$ in (7), the switched system in (1) is asymptotically stable in $\mathcal{L}$. Here, $\lambda_{max}^{(\cdot)}$ and $\lambda^{min^{(\cdot)}}$ refer to the maximum and minimum eigen values respectively of the quantity $(\cdot)$ and $W_2^p$ is defined as (10)$\forall p \in \mathcal{P}$.

$$\tau_d > \frac{1}{2\left(\sum \beta_i\right)} \log \frac{\prod \Lambda_{max}^{w_2^p}}{\prod \Lambda_{min}^{w_1^p}}, \ p = 1, 2, \dots m \in \mathcal{P} \qquad (7)$$

Proof: Here a brief sketch shows the stability of the attitude tracking errors for the individual subsystem.

Consider the individual subsystem's Lyapunov candidate $\forall p = 1, 2 \dots m \in \mathcal{P}$ as:

$$V_p = \frac{1}{2} e_\Omega^T H_p e_\Omega + k_R \Phi(R, R_d) + c_1 e_R \cdot e_\Omega \qquad (8)$$

In the sub-level set $\mathcal{L}$:

$$\Lambda_{min}^{w_1^p} \|z_1\|^2 \le V_p \le \Lambda_{max}^{w_2^p} \|z_1\|^2 \qquad (9)$$

where $z_1 = [\|e_R\| \|e_\Omega\|]^T$ and $W_1^p, W_2^p \in \mathbb{R}^{2\times2}$ are:

$$W_1^p = \frac{1}{2}\begin{bmatrix} b_1 k_R & -c_1 \\ -c_1 & \Lambda_{pmin} \end{bmatrix}, \ W_2^p = \frac{1}{2}\begin{bmatrix} b_2 k_R & c_1 \\ c_1 & \Lambda_{pmax} \end{bmatrix} \qquad (10)$$

It can be shown that:

$$V_p \le -2\beta_p V_p \qquad (11)$$

where $$\beta_p = \frac{\Lambda_{min}^{w_3^p}}{2\Lambda_{max}^{w_2^p}}.$$

Hence the tracking errors are exponentially stable for the individual subsystems. This implies that if $\sigma(t) = p$ for $t \in [t_0, t_0 + \tau_d)$:

$$V_p(z_1(t_0 + \tau_d)) \le e^{-2\beta_p \tau_d} V_p(z_1(t_0)) \qquad (12)$$

2) Stability of the overall switched system: Multiple Lyapunov functions can be used to prove the stability of the switched system. Consider the following Lemma 2.

Lemma 2: Consider a finite family of globally asymptotically stable systems, and let $V_p$, $p \in \mathcal{P}$ be a family of corresponding radially unbounded Lyapunov functions. Suppose that there exists a family of positive definite continuous functions $W_p p \in \mathcal{P}$ with the property that for every pair of switching times $(t_i, t_j)$, $i < j$, such that $\sigma(t_i) = \sigma(t_j)$ and $\sigma(t_k) \ne p$ for $t_i < t_k < t^j$, so:

$$V_p(x(t_j)) - V_p(x(t_i)) \le -W_p(x(t_i)) \qquad (13)$$

then the switched system in (1) is globally asymptotically stable.

Proof: Employing (11), a desired lower bound on the dwell-time can be found that corresponds to the amount of time that a system should reside in subsystem (geometric configuration) p to ensure that the overall tracking errors converge to zero. To elaborate, consider a system when $\mathcal{P} = [1,2]$ and $\sigma$ takes values of 1 on $[t_0, t_1)$ and 2 on $[t_1, t_2)$ such that $t_{i+1} - t_i \ge \tau_d$, $i = 0, 1$. From (12), the minimum dwell-time can be calculated using the theory of the switched systems as (7), which guarantees that the switched system (1) is asymptotically stable in $\mathcal{L}$ by employing Lemma 2.

Remark 3: Since the active reconfigurable quadrotors are designed to avoid collisions while flying through narrow gaps, by strictly adhering to the dwell time obtained in (7) and not allowing for the configuration switching, can be conservative. Hence the trajectory planner is designed to choose the switching signal trajectory, $\sigma(t)$, by accounting for both the dwell time and also the geometric space constraints, as discussed in Section V.

B. Case with Model Uncertainties in $H_p$, $\Delta=[0\ 0\ 0]^T$

The dwell-time derived in (7) ensures that the switched system is stable when the model (e.g., moment of inertia) is known. However, this is not the case for almost all real-world scenarios. To handle modeling errors, the moment of inertia can be estimated online for each subsystem (geometric configuration).

There have been many approaches to estimate the moment of inertia online, however researchers have only recently been studying ways to ensure physical consistency of the inertia estimates. The attitude controller framework outlined herein ensures physical consistency during adaptation of the inertia parameters.

1) Attitude tracking for individual subsystems: For the $p^{th}$ subsystem (geometric configuration), assume that the control torques are now generated according to:

$$u = -k_R e_R - k_\Omega e_\Omega - Y\hat{h}_p, \qquad (14)$$

$$\dot{\hat{h}}_p = -\left(\nabla^2 \psi(\hat{h}_p)\right)^{-1} Y^T e_A, \qquad (15)$$

$$e_A = e_\Omega + c_2 e_R, \qquad (16)$$

where the inertia parameters are estimated based on the augmented error $e_A$. Here, $\psi(\cdot)$ is the log-determinant function which ensures that the estimates of the inertia parameters are physically consistent given that the initial guess is also physically consistent.

Assumption 4: The minimum eigen value $\Lambda_{max}^P$ and the maximum eigen values $\Lambda_{min}^P$ of the true inertia matrix $H_p$ for the $p^{th}$ subsystem (geometric configuration) are known.

Proposition 5: Suppose that Assumption 4 holds. For the control generated according to (14)-(16), with positive constants $k_\Omega$ and $k_R$, if the positive constant c is chosen such that (17) holds, the attitude tracking errors, $(e_R, e_\Omega)$, for the individual subsystems (geometric configurations) converge to zero asymptotically. Eq. (17) below outlines a definition of the augmenting constant $c_2$ which may be estimated at least in part through simulation techniques or other approximation methods.

$$c_2 < \min\left\{\sqrt{\frac{2b_1 k_R \Lambda_{min}^P}{(\Lambda_{max}^P)^2}}, \frac{\sqrt{2} k_\Omega}{\Lambda_{max}^P tr[G]}, \frac{4k_R k_\Omega}{k_\Omega^2 + \frac{4}{\sqrt{2}} k_R \Lambda_{max}^P tr[G]}\right\} \qquad (17)$$

In other words, the augmenting constant $c_2$ has a value that is less than a minimum of a set of pre-determined constants (encompassing $$\sqrt{\frac{2b_1 k_R \Lambda_{min}^P}{(\Lambda_{max}^P)^2}}, \frac{\sqrt{2} k_\Omega}{\Lambda_{max}^P tr[G]}, \frac{4k_R k_\Omega}{k_\Omega^2 + \frac{4}{\sqrt{2}} k_R \Lambda_{max}^P tr[G]} \qquad (45)$$

of Eq. (17)) based on the vehicle configuration, which can be determined using a set of tuning parameters (e.g., $k_R$, $k_\Omega$, $g_1$, $g_2$, $g_3$, $b_1$) for the geometric configuration of the vehicle, an estimated minimum eigenvalue $\Lambda_{min}^P$ of an inertia matrix for the geometric configuration of the vehicle, and an estimated maximum eigenvalue $\Lambda_{max}^P$ of the inertia matrix for the geometric configuration of the vehicle. These values may be estimated or otherwise approximated through a simulation process.

Proof: This proof will again analyze the stability of the individual system and the stability of the switched system. Consider the Lyapunov candidate for individual subsystem (geometric configuration) as the following:

$$\mathcal{V}_p = \frac{1}{2} e_\Omega^T H_p e_\Omega + k_R \Phi(R, R_d) + c e_R \cdot H_p e_\Omega + d_\psi\left(h_p \| \hat{h}\right) \qquad (18)$$

where $d_\psi(h_p \| \hat{h}_p)$ is the Bregman divergence operator:

$$d_\psi\left(h_p \| \hat{h}_p\right) = \psi(h_p) - \psi(\hat{h}_p) - \left(h_p - \hat{h}_p\right)^T \nabla \psi(\hat{h}_p)$$

and the time-derivative of $d_\psi(h_p \| \hat{h}_p)$ is $$\dot{d}_\psi(\cdot) = \left(\hat{h}_p - h_p\right)^T \nabla^2 \psi(\hat{h}_p)\dot{\hat{h}}_p \qquad (19)$$

As shown, $d_\psi(h_p \| \hat{h}_p)$ can be taken as an approximation for the geodesic estimation error with the properties required of a desired Lyapunov candidate. Also, from (3), $V_p$ is lower-bounded by:

$$z^T W_{11} z \le \mathcal{V}_p \qquad (20)$$

where $z = [z_1, z_2]^T = [\|e_R\|, \|e_\Omega\|, d_\psi(h_p \| \hat{h})]^T \in \mathbb{R}^3$ and $W_{11} \in \mathbb{R}^{3 \times 3}$ is given by:

$$W_{11} = \begin{bmatrix} b_1 k_R & \frac{1}{2}c_2\Lambda_{max}^P & 0 \\ \frac{1}{2}c_2\Lambda_{max}^P & \frac{1}{2}\Lambda_{min}^P & 0 \\ 0 & 0 & 1 \end{bmatrix} \qquad (21)$$

Furthermore:

$$z_1^T W_{13}^P z_1 \le \mathcal{V}_p \le z_1^T W_{23}^P z_1 \qquad (22)$$

where $z_1 = [\|e_R\|, \|e_\Omega\|]^T$ and $W_{13}^P, W_{23}^P \in \mathbb{R}^{2 \times 2}$ are given by:

$$W_{13}^P = \begin{bmatrix} b_1 k_R & \frac{1}{2}c_2\Lambda_{max}^P \\ \frac{1}{2}c_2\Lambda_{max}^P & \frac{1}{2}\Lambda_{min}^P \end{bmatrix}, W_{23}^P = \frac{1}{2}\begin{bmatrix} b_2 k_R & \frac{1}{2}c_2\Lambda_{min}^P \\ \frac{1}{2}c_2\Lambda_{min}^P & \frac{1}{2}\Lambda_{max}^P \end{bmatrix} \qquad (23)$$

i.e., $$\Lambda_{min}^{W_{13}^P} \|z_1\|^2 \le \mathcal{V}_p \le \Lambda_{max}^{W_{23}^P} \|z_1\|^2$$

Differentiating $\mathcal{V}_p$ along the solutions of the system and substituting for the control law, u, and parameter estimate law, $\dot{\hat{h}}$, from (14) and (16):

$$\dot{\mathcal{V}}_p \le -\left(k_\Omega - \frac{c_2}{\sqrt{2}}\Lambda_{pmax}tr[G]\right)\|e_\Omega\|^2 - c_2 k_R \|e_R\|^2 + c_2 k_\Omega \|e_R\| \|e_\Omega\| = -z_1^T W_{31}^P z_1 \qquad (24)$$

where $W_{31}^P \in \mathbb{R}^{2 \times 2}$ is defined in (25):

$$W_{31} = \begin{bmatrix} c_2 k_R & -\frac{c_2 k_\Omega}{2} \\ -\frac{c_2 k_\Omega}{2} & k_\Omega - \frac{c_2}{\sqrt{2}}\Lambda_{max}^P tr[G] \end{bmatrix} \qquad (25)$$

$W_{31}^P$ is referred to herein as a "third matrix" which incorporates: the augmenting constant $c_2$, a set of tuning parameters (e.g., $k_R$, $k_\Omega$, $g_1$, $g_2$, $g_3$) for the geometric configuration of the vehicle, and an estimated maximum eigenvalue $\Lambda_{max}^P$ of the inertia matrix for the geometric configuration of the vehicle.

This implies that the errors $z_1 = [\|e_R\|, \|e_\Omega\|]^T$ asymptotically converge to zero.

Remark 6: Although the tracking errors converge to their zero equilibrium, (25) does not ensure that the parameter errors converge. This is because of the absence of persistence of excitation which would aid in parameter convergence to true values. However, the attitude tracking errors are still guaranteed to be stable and do not depend on the parameter estimation error.

Remark 7: The Assumption 4 requires that the minimum and maximum eigenvalues of the true inertia matrix be known. These values are used to find the constant $c_2$ in (16) and therefore can be relaxed such that values from approximate CAD models should be enough.

2) Stability of the switched system: Multiple Lyapunov functions can again be used to establish the stability of the attitude tracking dynamics with the adaptive controller. Consider the following Proposition 8:

Proposition 8: Consider the system (1) and that Assumption 4 holds. With the control generated according to (14)-(16), if the initial guess of inertia parameters, $\hat{h}_p$, for each subsystem (geometric configuration) is adaptively updated and the switching is performed at time $t_j \gg t_i$ such that (26) holds, then the attitude tracking errors ($e_R$, $e_\Omega$) of the switched system converge to zero asymptotically.

$$\|z_1(t_j)\|^2 \leq \left(\frac{\Lambda_{min}^{W_{13}^P}}{\Lambda_{max}^{W_{23}^P}}\right)\|z_1(t_i)\|^2 \tag{26}$$

In some examples, the minimum dwell time incorporates a ratio between a minimum eigenvalue $\Lambda_{min}^{W_{13}^P}$ min of a first matrix WP and a maximum eigenvalue $\Lambda_{max}^{W_{13}^P}$ of a second matrix $W_{23}^P$. The first matrix is associated with pre-determined values based on the vehicle configuration which can be determined using the augmenting constant $c_2$, a first subset of tuning parameters ($b_1$, $k_R$) for the geometric configuration of the vehicle, the estimated minimum eigenvalue $\Lambda_{min}^P$ of the inertia matrix for the geometric configuration of the vehicle, and the estimated maximum eigenvalue $\Lambda_{max}^P$ of the inertia matrix for the geometric configuration of the vehicle. The second matrix is associated with pre-determined values based on the vehicle configuration which can be determined using the augmenting constant $c_2$, a second subset of tuning parameters ($b_2$, $k_R$) for the geometric configuration of the vehicle, the estimated minimum eigenvalue $\Lambda_{min}^P$ of the inertia matrix for the geometric configuration of the vehicle, and the estimated maximum eigenvalue $\Lambda_{max}^P$ of the inertia matrix for the geometric configuration of the vehicle.

Proof: To analyze this case, consider a switched system generated by two dynamical systems such that $\mathcal{P} = [1, 2]$. Let $t_i < t_j$ be two switching times when $\sigma = 1$. Then, using Proposition 8, the fourth term in (18), $d_\psi(h_p\|\hat{h})$, is adaptively updated from the previous value, hence is constant at the two time instants $t_i$ and $t_j$. Next, (23) provides the bounds on the first three terms of the Lyapunov candidate at the two time intervals. Hence if the switching time instant is chosen such that (26) holds, the switched system is asymptotically stable using Lemma 2.

Remark 9: Note that Proposition 8 enforces the minimum dwell-time ($\tau_d$) requirement for the switched system stability. As mentioned in Remark 3, the planner is made aware of the dwell-time such that the reference trajectory is generated to accommodate the dwell-time requirements as described in the following Section V.

Remark 10: Since it is well-known that the adaptive controllers can be unstable even for slight disturbance, the control law proposed in (14)-(16) can be modified to include a robust term in the following Section IV-C.

C. Case with Model Uncertainties in $H_p$ and External Disturbances, $\Delta \neq [0\ 0\ 0]^T$ Finally, this section discusses the case when there are modelling uncertainties coupled with external disturbances to improve the robustness of the proposed adaptive controller in the presence of disturbances.

Assumption 11: The disturbances in attitude dynamics have known bounds, i.e., $\|\Delta\| \leq \delta_R$ for a positive constant. The value of $\delta_R$ may be approximated or otherwise obtained through simulation methods.

Proposition 12: Suppose Assumptions 4 and 10 hold. Then, if the control torques are generated according to a control "law":

$$u = -k_R e_R - k_\Omega e_\Omega - Y\hat{h} + \mu, \tag{27}$$

$$\dot{\hat{h}} = -\left(\nabla^2 \psi(\hat{h})\right)^{-1} Y^T e_A, \tag{28}$$

$$\mu = -\left(\delta_R - \frac{\eta}{\|e_A\|}\right)\frac{e_A}{\|e_A\|}, \tag{29}$$

$$e_A = e_\Omega + c_2 e_R, \tag{30}$$

where $\eta$ is a small positive constant which is adaptively chosen such that $\eta < z_1^T W_{31}^P z_1$, the attitude tracking errors asymptotically converge to their zero equilibrium.

In other words, the robust control term $\mu$ incorporates a small positive constant $\eta$ which is adaptively chosen to be less than a scalar value ($z_1^T W_{31}^P z_1$), which incorporates the attitude tracking error (as $z_1^T$, $z_1$) and the third matrix ($W_{31}^P$, given in Eq. 25) associated with the geometric configuration. The robust control term u also incorporates an estimated upper bound $\delta_R$ on external disturbances with respect to attitude dynamics for the vehicle in addition to the augmented error $e_A$ (which incorporates augmenting constant $c_2$).

Proof: The proof is similar as presented in Section IV-B and is given in Section VII-D.

Remark 13: The Assumption 11 assumes that the disturbances in the attitude dynamics are bounded (e.g., $\|\Delta\| \leq \delta_R$). Since $\delta_R$ is used to generate the robust control term $\mu$, a rough approximate can be used based on the aerodynamic conditions of the flight space.

V. Control-Aware Minimum Jerk Trajectory

Figure 2B:
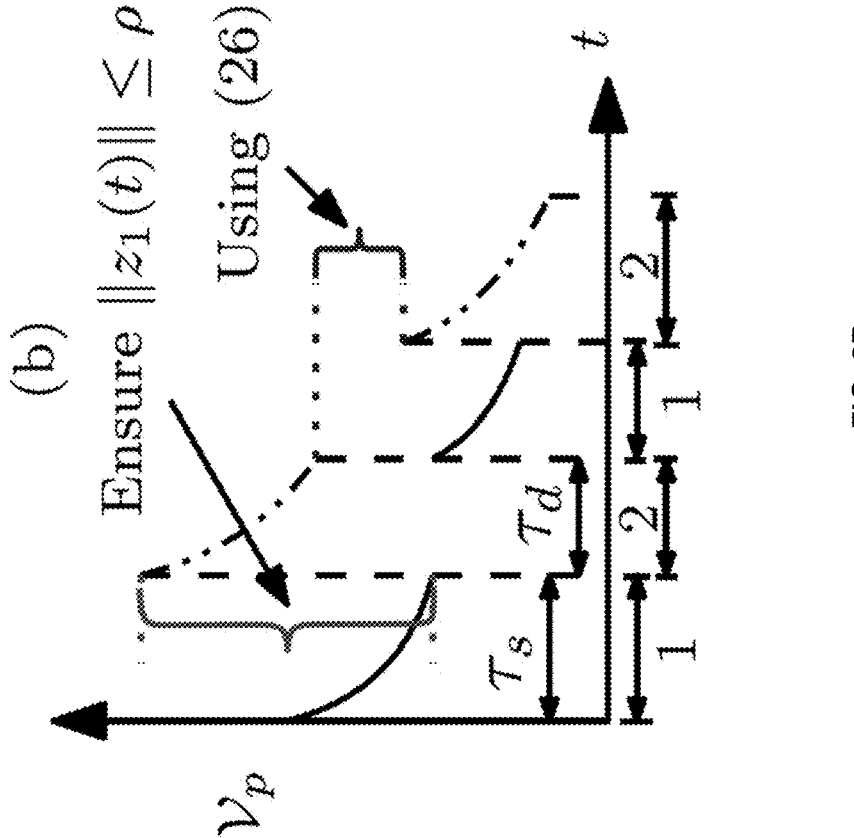
FIGS. 2A and 2B illustrate Lyapunov function of the attitude tracking error of the foldable quadrotor of FIGS. 1A and 1B during configuration switching.
Figure 2A:
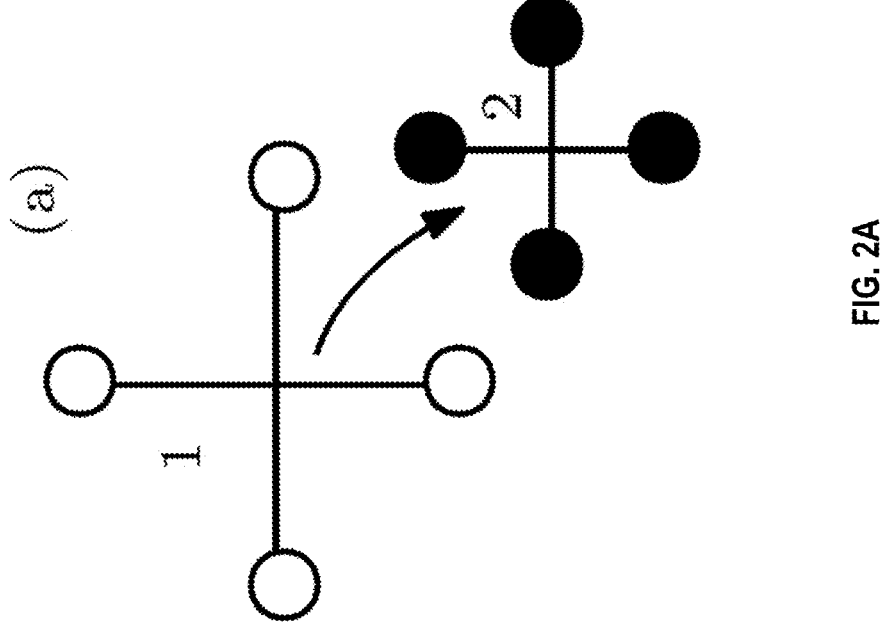
Figure 3A:
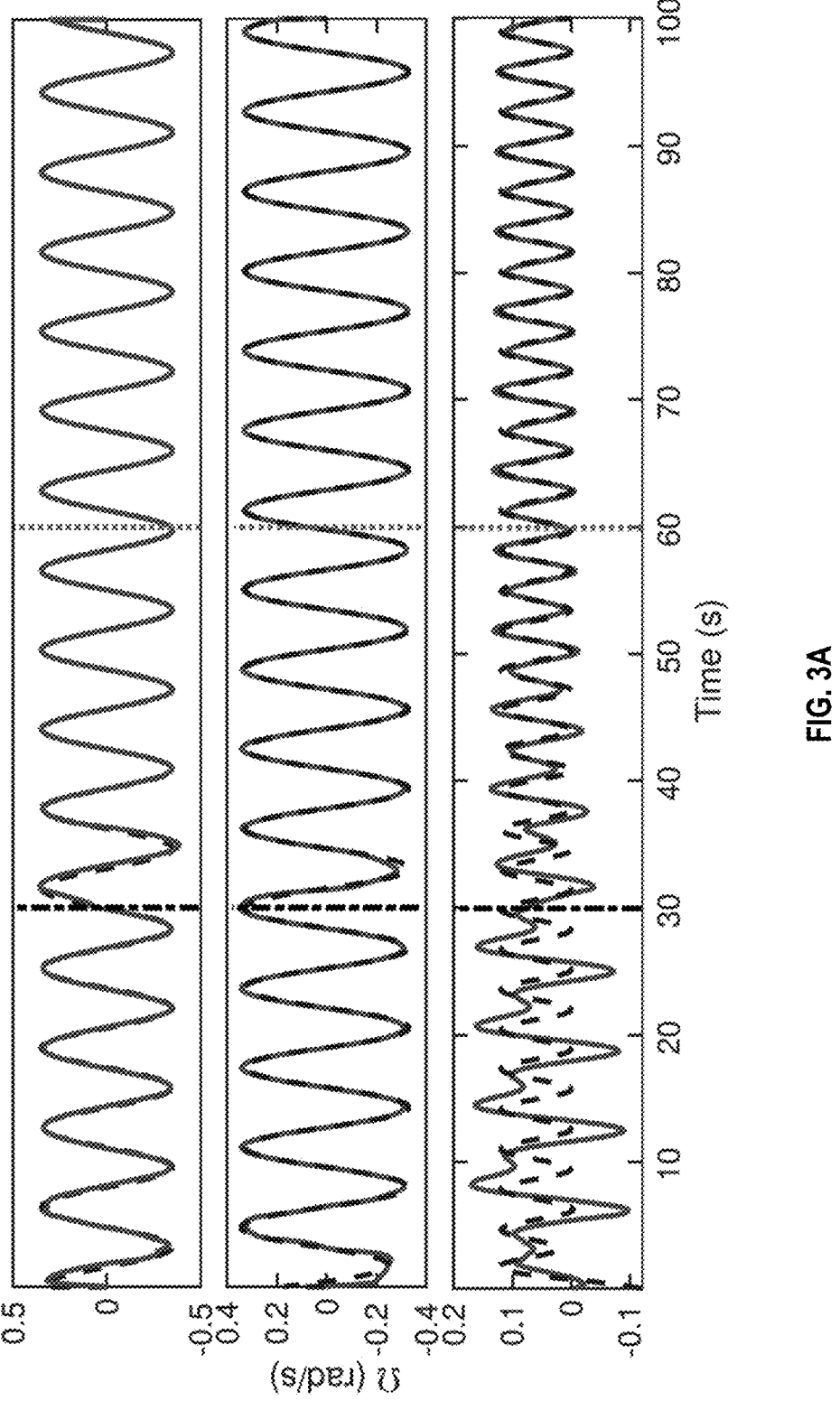
FIGS. 3A-3D are a series of graphical representations showing performance of the attitude controller of FIGS. 1A and 1B when the vehicle switches between the two configurations shown in FIGS. 2A and 2B.
Figure 3B:
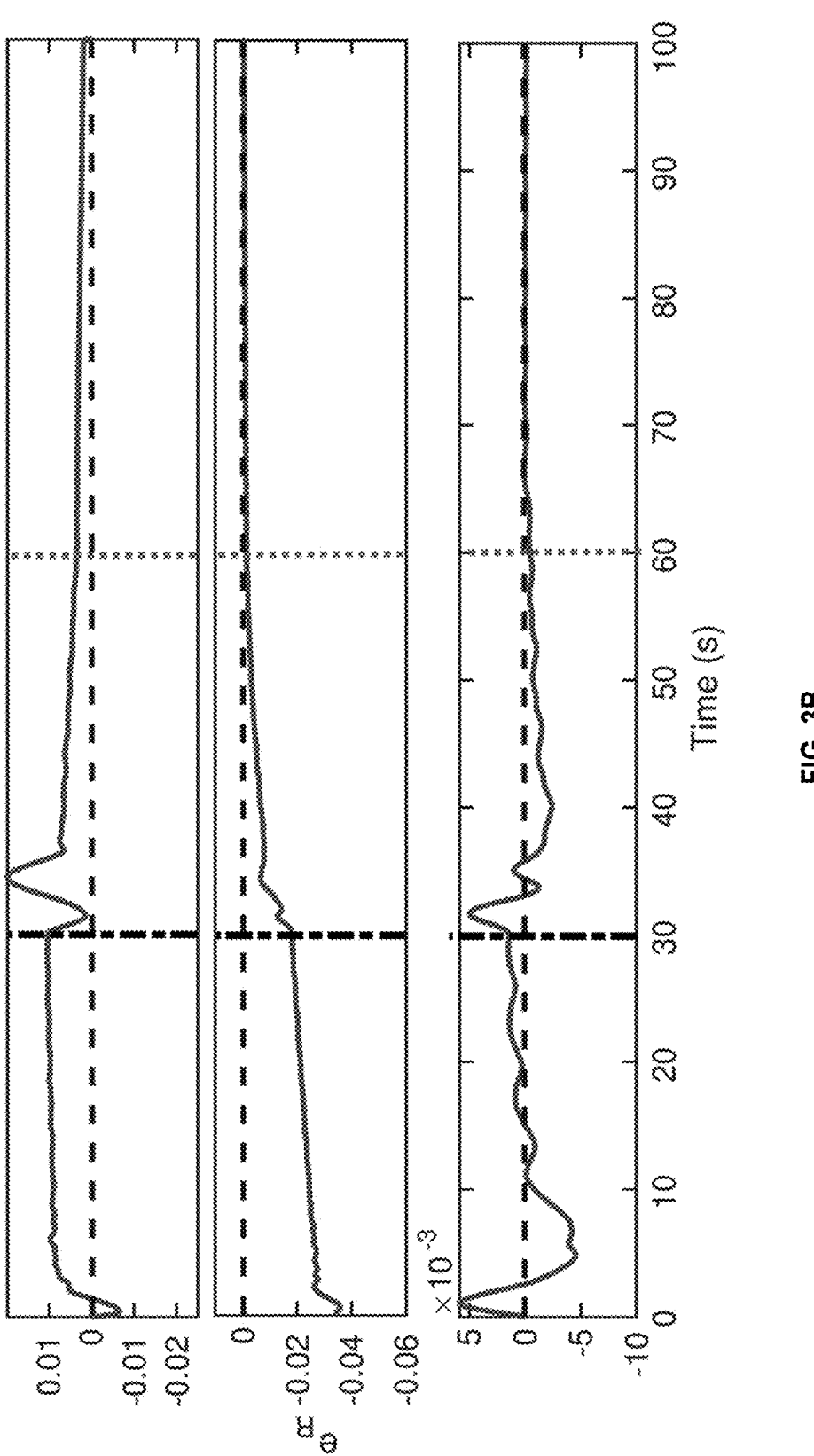
Figure 3C:
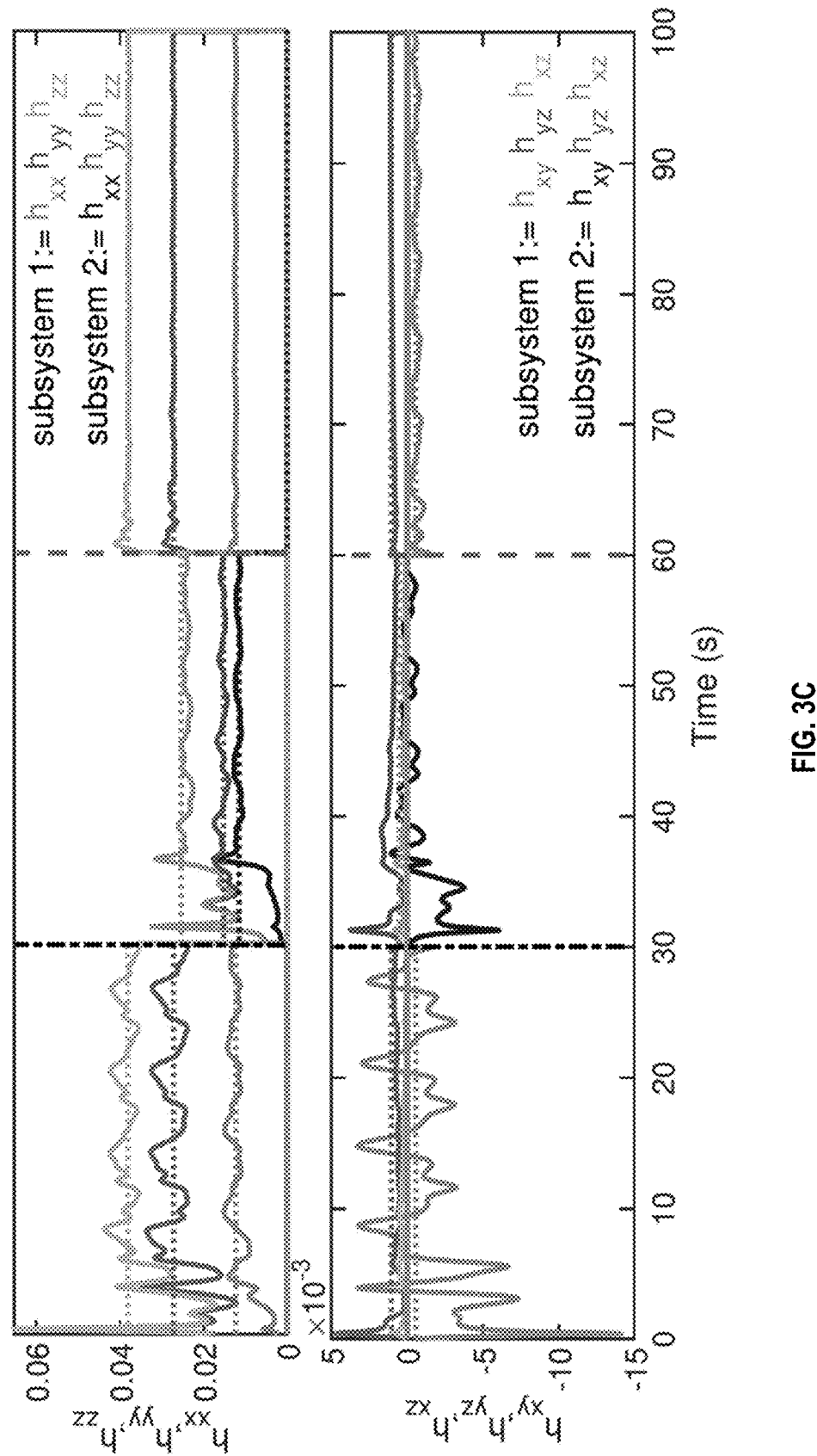
Figure 3D:
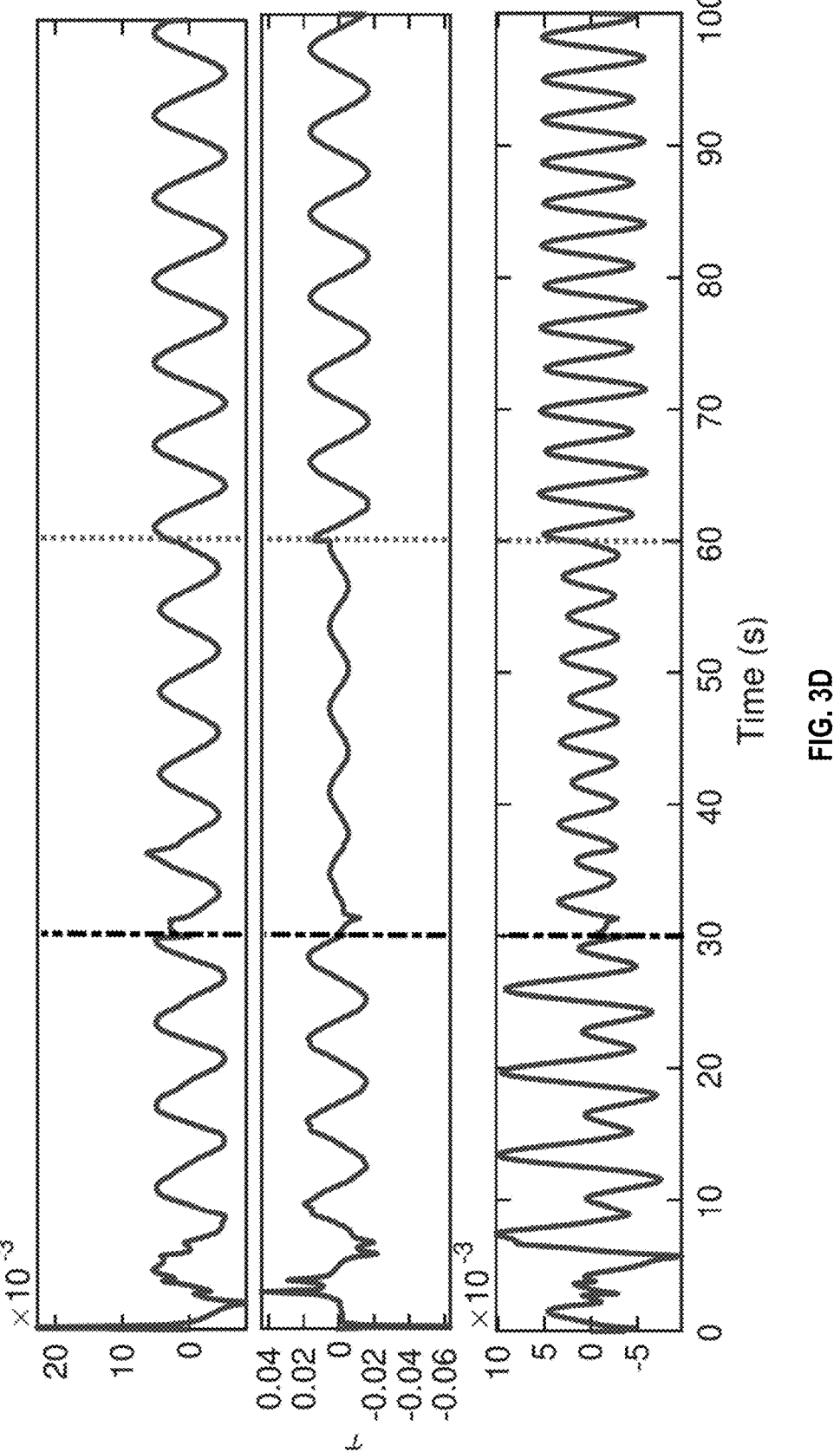

The Proposition 8 in IV-B.2 with (26) implies that for the switched system to have asymptotic tracking stability, the minimum dwell-time before switching should be calculated as a percentage or ratio of the initial tracking error. This is shown in FIGS. 2A and 2B (blue line). However, this doesn't still quantify the bounds of $\|\mathcal{V}_i(t) - \mathcal{V}_j(t)\| \forall i \neq j; i,j \in \mathcal{P}$ as shown by the red line.

Assumption 14: The upper bound on the estimation error for the $p^{th}$ subsystem, $z_2^P(t)$ is known.

Assumption 15: The settling time corresponding to the maximum attitude error for the $p^{th}$ subsystem is known.

Proposition 16: Suppose that Assumptions 4, 14 and 15 hold, if switching is performed at $t=\tau_s$ when $\|z_1{}^P(\tau_s)\|\leq\rho$ where $\tau_s$ denotes the settling-time for the attitude errors, $e_R$ and $e_\Omega$, and $\rho>0$ denotes the region within which the errors remain, the minimum value of the difference in the two Lyapunov functions at the same time instant (the jump in the Lyapunov value, shown by the red line in FIGS. 2A and 2B) can be written as:

$$\|\mathcal{V}_i(\tau_s) - \mathcal{V}_j(\tau_s)\| \leq \left(\Lambda_{max}^{W_{21}^i} + \Lambda_{max}^{W_{21}^j}\right)\rho + \Lambda_{max}^{W_{21}^i}\|z_2^i(\tau_s)\| + \Lambda_{max}^{W_{21}^j}\|z_2^j(\tau_s)\| \tag{31}$$

Proof: Proposition 16 directly follows from the minimum value of (32) by employing (18):

$$\mathcal{V}_p \leq \Lambda_{max}^{W_{21}^p}\|z\|^2, \text{ with } W_{21} = \begin{bmatrix} b_2 k_R & \frac{1}{2}c_2\Lambda_{min}^p & 0 \\ \frac{1}{2}c_2\Lambda_{min}^p & \frac{1}{2}\Lambda_{max}^p & 0 \\ 0 & 0 & 1 \end{bmatrix} \tag{32}$$

Remark 17: The Assumption 14 implies that the maximum estimation error should be bounded. This can be achieved in various ways for example by using the Projection operator and by assuming a maximum estimation error.

Remark 18: The Assumption 15 requires that the settling time for the quadrotor for a $p^{th}$ configuration be known and this information can be approximated estimated as a rough upper bound from real experimental data.

Since the position controller is a proportional-derivative control on position, waypoint planning to fly through passages is not ideal which would result in high initial attitude errors such that $z_1{}^i(t)\dot{=}\rho$ if the vehicle switches before the attitude errors' settling-time. Alternatively, the minimum-jerk trajectory (MJT) planner can be successfully employed here to ensure $z_1{}^i(t)\leq\rho$ by imposing the desired velocity boundary conditions at the entrance of the passageway, where configuration switching is mandated by the geometric constraint. The time taken to reach this velocity should be set to at least $\tau_s$. By ensuring that the vehicle has attained this velocity, the attitude errors will be lower at the entrance of the passageway in the absence of external disturbances. Hence this will lead to lower bounds on the tracking errors as given by (31).

As such, the MJT planner 110 of the system 100 determines or otherwise accesses the minimum dwell time that restricts the switching time to accommodate modeling uncertainties associated with switching between geometric configurations, the minimum dwell time incorporating a percentage or ratio of the attitude tracking error. The MJT planner 110 can then update, based on the attitude tracking error, the reference trajectory to reflect an adapted reference trajectory including an adapted reference attitude based on: the minimum dwell time $\tau_d$ which gets updated based on the attitude tracking error, the settling time $\tau_s$ associated with attitude tracking stabilization for the vehicle under the geometric configuration, and the reference trajectory. The adapted reference trajectory can be generated based on a set of trajectory boundary conditions that incorporate a target position of an entrance of a passageway where the vehicle is expected to reach over a time interval that is greater than the settling time and the minimum dwell time, as well as a target velocity for the vehicle to travel through the passageway over the time interval that is greater than the settling time and the minimum dwell time. The system 100 can further generate, based on the adapted reference trajectory, a mode switching signal to transition the vehicle between a first geometric configuration and a second geometric configuration at the switching time, the switching time being selected based on: the minimum dwell time, the settling time, a position of the vehicle in view of the adapted reference trajectory, and a velocity of the vehicle in view of the adapted reference trajectory.

Signals from the MJT planner 110 are generated according to:

$$r^*(t) = \operatorname*{argmin}_{r(t)} \int_0^T \dddot{r}^2 dt \tag{33}$$

with the following boundary conditions:

$$r(0) = [0, 0, 0]^T, \dot{r}(0) = [0, 0, 0]^T, \ddot{r}(0) = [0, 0, 0]^T \tag{34}$$
$$r(\tau) = r_{des}, \dot{r}(\tau) = \dot{r}_{des}, \ddot{r}(\tau) = [0, 0, 0]^T$$

where $r_{des}$ and $\dot{r}_{des}$ respectively denote the coordinates of the entrance of the passageway and the desired velocity to fly through the passageway, and $\tau\geq\max\{\tau_s, \tau_d\}$ where $\tau_d$ is the minimum dwell time defined as $t_i-t_j$ from (26) for the $p^{th}$ system.

VI. Results and Discussion

This section describes the various case scenarios simulated to validate the proposed controller for the switched system. The position controller shown in FIGS. 1A and 1B is implemented to generate the necessary desired orientation and thrust. Refer to Section VII-I further details about the simulation parameters. Results for the case scenario (2) are shown in FIGS. 3A-3D and show the switching is performed after the errors have decreased and the tracking errors converge to their zero equilibrium to validate Proposition 8 in the presence of modeling uncertainties in inertia. The parameter estimates also converge (however, this is not guaranteed due to the absence of persistence of excitation). Since the developed controller is a PD controller, it is inherently robust to small uncertainties and hence almost perfect tracking of roll and pitch rate in the body frame is observed even when the inertia estimates oscillate. However, for the subsystem 1, the uncertainty in the z direction is significantly higher, implying the yaw torque was not enough. Yaw rate tracking is eventually achieved by utilizing the estimation of the inertia parameters.

Figure 4:
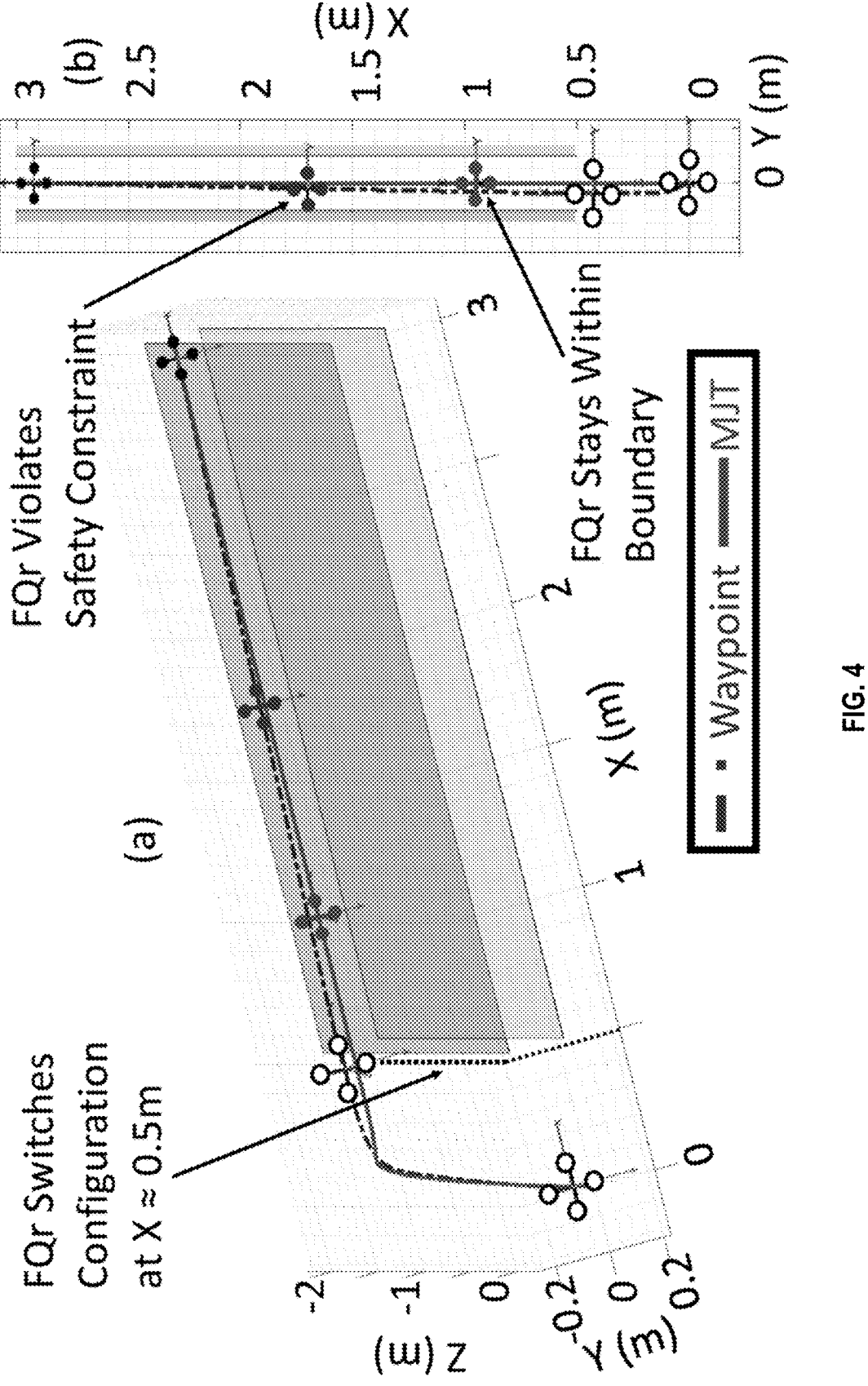
FIG. 4 is a graphical representation showing tracking results for minimum-jerk trajectory and waypoint-based methods.

Next, the proposed attitude controller can be integrated with a minimum-jerk trajectory planner and compare the performance against a waypoint-based planner to validate Proposition 12. The MJT-based planning framework demonstrates how the vehicle transitions from the initial configuration to the new configuration at $[0.5 \ 0\text{-}2]^T$m at $t=9.02$ s without giving rise to additional tracking errors as shown in FIG. 4, shown in red solid lines. The waypoint-based planner, however, arrives at the same position at $t=5.24$ s which is less than the maximum attitude settling time ($\tau_s=8.87$ s) and therefore has high attitude errors during the transitioning. This leads to higher switch-based disturbances, violating the safety constraints as shown.

In this disclosure, an approach is outlined for analyzing the attitude tracking stability of foldable quadrotors (FQrs) by modeling them as switched systems. This analysis is employed to design an adaptive control law and derived the necessary dwell-time requirements for guaranteeing the asymptotic stability of the attitude tracking errors in the presence of bounded disturbances. Another highlight of the work was to exploit the attitude settling-time information and design the boundary conditions for a control-aware trajectory planner to achieve stable flights during switching. Future work includes extension of the adaptive control law to account for other matched and mismatched input uncertainties.

VII. Further Detail about Controller Definitions, Proofs, and Simulation Details A. Switching Signal. A piece-wise constant function $\sigma: [0, \infty) \rightarrow \mathcal{P}$. with a finite number of discontinuities and takes a constant value on every interval between two consecutive switching time instants. The role of $\sigma$ is to specify, at each time instant t, the index $\sigma(t) \in \mathcal{P}$ of the active subsystem model from the family of switched systems.

B. Hat Map. The hat map $\hat{\cdot}$: $\mathbb{R}^3 \rightarrow SO(3)$ is a symmetric matrix operator defined by the condition that $\hat{x}y = x \times y \ \forall x, y \in \mathbb{R}^3$. An example is provided here: The angular velocity vector $\Omega = [\omega_x, \omega_y, \omega_z]^T$ may be equivalently expressed as an angular velocity tensor, the matrix (or linear mapping) defined by:

$$\hat{\Omega} = \begin{pmatrix} 0 & -\omega_z & \omega_y \\ \omega_z & 0 & -\omega_x \\ -\omega_y & \omega_x & 0 \end{pmatrix} \tag{35}$$

C. Vee Map. The vee map $v: SO(3) \rightarrow \mathbb{R}^3$ represents the inverse of the hat map and $[.]_x$ is the new skew symmetric cross product matrix. For example, $\hat{\Omega}^v = \Omega$.

D. Attitude dynamics and $Y_1$. The attitude dynamics for an individual subsystem can be rewritten in the form of $$H_p \dot{\Omega} - Y_1 h_p = u + \Delta \tag{36}$$

where $Y_1$ is given by $$Y_1 = \begin{bmatrix} 0 & \omega_2\omega_3 & -\omega_2\omega_3 & \omega_1\omega_3 & -\omega_1\omega_2 & \omega_3^2-\omega_2^2 \\ -\omega_1\omega_3 & 0 & \omega_1\omega_3 & -\omega_2\omega_3 & \omega_1^2-\omega_3^2 & \omega_2\omega_1 \\ \omega_1\omega_2 & -\omega_2\omega_1 & 0 & \omega_2^2-\omega_1^2 & \omega_3\omega_2 & -\omega_3\omega_2 \end{bmatrix} \tag{37}$$

and $$h_p = \begin{matrix} h_{p_{xx}} \\ h_{p_{yy}} \\ h_{p_{zz}} \\ h_{p_{xy}} \\ h_{p_{xz}} \\ h_{p_{zz}} \end{matrix}$$

is the vector encompassing the unique elements of the moment of inertia tensor.

E. Definition of $Y_2$. $Y_2$ is defined as $$Y_2 = \begin{bmatrix} \alpha_{d1} & 0 & 0 & \alpha_{d2} & \alpha_{d3} & 0 \\ 0 & \alpha_{d2} & 0 & \alpha_{d1} & 0 & \alpha_{d3} \\ 0 & 0 & \alpha_{d3} & 0 & \alpha_{d1} & \alpha_{d2} \end{bmatrix} \tag{38}$$

F. Case (1). In this section, we present the detailed proof for the exponential convergence of tracking errors for individual subsystems. The control moment in this case is generated according to (5).

$$u = -k_R e_R - k_\Omega e_\Omega - Y_1 h_p \tag{39}$$

$$\text{where } Y = Y_1 - Y_2.$$

Proof. Consider the individual subsystem's Lyapunov candidate $\forall p=1, 2 \ldots m \in \mathcal{P}$ as $$\mathcal{V}_p = \frac{1}{2} e_\Omega^T H_p e_\Omega + k_R \Phi(R, R_d) + c_1 e_R \cdot H_p e_\Omega \tag{40}$$

In the sub-level set $\mathcal{L}$, we have $$z^T W_1^p z \leq \mathcal{V}_p \leq z^T W_2^p z \tag{41}$$

where $z = [\|e_R\| \ \|e_\Omega\|]^T$ and $W_1^p$, $W_2^p$ are given by $$W_1^p = \begin{bmatrix} b_1 k_R & \frac{1}{2}c_1\Lambda_{p_{max}} \\ \frac{1}{2}c_1\Lambda_{p_{max}} & \frac{1}{2}\Lambda_{p_{min}} \end{bmatrix}, W_2^p = \begin{bmatrix} b_2 k_R & \frac{1}{2}c_1\Lambda_{p_{max}} \\ \frac{1}{2}c_1\Lambda_{p_{max}} & \frac{1}{2}\Lambda_{p_{min}} \end{bmatrix}$$

i.e., $$\Lambda_{min}^{W_1^p}\|z\|^2 \leq \mathcal{V}_p \leq \Lambda_{max}^{W_2^p}\|z\|^2 \tag{42}$$

Differentiating $\mathcal{V}$ along the solutions of the system $$\dot{\mathcal{V}}_p = e_\Omega^T H_p \dot{e}_\Omega + k_R e_R \cdot e_\Omega + c_1 \dot{e}_R \cdot H_p e_\Omega + c_1 e_R \cdot H_p \dot{e}_\Omega$$

Now, substituting (37), (38), and (39), we obtain $$= e_\Omega^T(-k_R e_R - k_\Omega e_\Omega - Y h_p + Y_1 h_p) - e_\Omega^T Y_2 h_p + k_R e_R \cdot e_\Omega +$$

$$c_1 C(R_d^T, R)e_\Omega \cdot H_p e_\Omega + c_1 e_R^T(-k_R e_R - k_\Omega e_\Omega - Y \hat{h}_p + Y_1 h_p) - c_1 e_R^T Y_2 h_p =$$

$$-k_\Omega e_\Omega^T e_\Omega + c_1 C(R, R_d)e_\Omega \cdot H_p e_\Omega - c_1 k_R e_R^T e_R - c_1 k_\Omega e_R \cdot e_\Omega$$

Since $$\dot{V}_p \leq -\left(k_\Omega - \frac{c_1}{\sqrt{2}}\Lambda_{pmax}tr[G]\right)\|e_\Omega\|^2 - c_1k_R\|e_R\|^2 + c_1k_\Omega\|e_R\|\|e_\Omega\| = \tag{43}$$

$$-z^T W_3 z,$$

$$C(R, Rd)e_\Omega \leq \frac{1}{\sqrt{2}}tr[G]\|e_\Omega\|,$$

where $W_3^p$ is given by (44)

$$W_3^p = \begin{bmatrix} c_1k_R & -\dfrac{c_1}{2} \\ -\dfrac{c_1}{2} & k_\Omega - \dfrac{c_1}{\sqrt{2}}\Lambda_{pmax}tr[G]. \end{bmatrix} \tag{44}$$

Therefore, $$\dot{V}_p \leq -\Lambda_{min}^{W_3^p}\|z\|^2 \tag{45}$$

Let $$\beta_p = \frac{\Lambda_{min}^{W_3^p}}{2\Lambda_{max}^{W_2^p}}, \tag{}$$

then from (42) and (45), we have $$\dot{V}_p \leq -2\beta_p V_p \tag{46}$$

Hence the tracking errors are exponentially stable for the individual subsystems. This implies that if $\sigma(t)=p$ for $t \in [t_0, t_0+\tau_d)$, we have $$V_p(z(t_0 + \tau_d)) \leq e^{-2\beta_p\tau_d}V_p(z(t_0))) \tag{47}$$

G. Case (2). In this section, we present the proof for asymptotic stability of tracking errs for individual subsystems when inertia parameters are not known and there are no external disturbances. The control torques are generated according to $$u = -k_Re_R - k_\Omega e_\Omega - Y\hat{h}_p \tag{48}$$

$$\dot{\hat{h}}_p = \left(-\nabla^2\psi(\hat{h}_p)\right)^{-1}Y^Te_A,$$

$$e_A = e_\Omega + c_2e_R$$

Proof $$V_p = \frac{1}{2}e_\Omega^T H_p e_\Omega + k_R\Phi(R, R_d) + c_2e_R \cdot H_p e_\Omega + d_\psi\left(h_p\|\hat{h}\right) \tag{49}$$

where $d_\psi(h_p\|\hat{h}_p)$ is the Bregman divergence operator:

$$d_\psi\left(h_p\|\hat{h}_p\right) = \psi(h_p) - \psi(\hat{h}_p) - \left(h_p - \hat{h}_p\right)^T\nabla\psi(\hat{h}_p)$$

and the time-derivative of $d_\psi(h_p\|\hat{h}_p)$ is $$\dot{d}_\psi(\cdot) = \left(\hat{h}_p - h_p\right)^T\nabla^2\psi(\hat{h}_p)\dot{\hat{h}}_p \tag{50}$$

$d_\psi(h_p\|\hat{h}_p)$ can be taken as an approximation for the geodesic estimation error with the properties required of a desired Lyapunov candidate. Also, from $$b_1\|e_R(R, Rd)\|^2 \leq \phi(R, Rd) \leq b_2\|e_R(R, Rd)\|^2$$

we have that $V_p$ is lower-bounded by $$z^T W_{11}z \leq V_p \tag{51}$$

where $z=[z_1, z_2]^T=[\|e_R\|, \|e_\Omega\|, d_\psi(h_p\|\hat{h}_p)]^2 \in \mathbb{R}^3$ and $W_{11} \in \mathbb{R}^{3\times 3}$ is given by $$W_{11} = \begin{bmatrix} b_1k_R & \dfrac{1}{2}c_2\Lambda_{max}^p & 0 \\ \dfrac{1}{2}c_2\Lambda_{max}^p & \dfrac{1}{2}\Lambda_{min}^p & 0 \\ 0 & 0 & 1 \end{bmatrix} \tag{52}$$

Furthermore, we have $$z_1^T W_{13}^p z_1 \leq V_p \leq z_1^T W_{23}^p z_1 \tag{53}$$

where $z_1=[\|e_R\|, \|e_\Omega\|]^T$ and $W_{13}^p, W_{23}^p \in \mathbb{R}^{2\times 2}$ are given by $$W_{13}^p = \begin{bmatrix} b_1k_R & \dfrac{1}{2}c_2\Lambda_{max}^p \\ \dfrac{1}{2}c_2\Lambda_{max}^p & \dfrac{1}{2}\Lambda_{min}^p \end{bmatrix}, W_{23}^p = \frac{1}{2}\begin{bmatrix} b_2k_R & \dfrac{1}{2}c_2\Lambda_{min}^p \\ \dfrac{1}{2}c_2\Lambda_{min}^p & \dfrac{1}{2}\Lambda_{max}^p \end{bmatrix}$$

i.e., $$\Lambda_{min}^{W_{13}^p}\|z_1\|^2 \leq V_p \leq \Lambda_{max}^{W_{23}^p}\|z_1\|^2 \tag{54}$$

Differentiating $\mathcal{V}_p$ along the solutions of the system and employing (48), we obtain $$\dot{v}_p = e_\Omega^T H_p \dot{e}_\Omega + k_R e_R \cdot e_\Omega + c_2 \dot{e}_R \cdot H_p e_\Omega + c_2 e_R \cdot H_p \dot{e}_\Omega + \dot{d}_\psi(\cdot) =$$

$$-k_\Omega e_\Omega^T e_\Omega + e_\Omega^T Y(\hat{h}_p - h_p) + c_2 C(R_d^T, R) e_\Omega \cdot H_p e_\Omega -$$

$$c_2 k_R e_R^T e_R + c_2 e_R \cdot Y(\hat{h}_p - h_p) - c_2 k_\Omega e_R \cdot e_\Omega + \dot{d}_\psi(\cdot) = -k_\Omega e_\Omega^T e_\Omega +$$

$$c_2 C(R_d^T, R) e_\Omega \cdot H_p e_\Omega - c_2 k_R e_R^T e_R + e_A \cdot Y(\hat{h}_p - h_p) - c_2 k_\Omega e_R \cdot e_\Omega + \dot{d}_\psi(\cdot) \quad 10$$

Substituting for the control law, $\mu$, and parameter estimate law, $\hat{h}$ $$\dot{v}_p = -k_\Omega e_\Omega^T e_\Omega - c_2 k_R e_R^T e_R + c_2 C(R_d^T, R) e_\Omega \cdot H_p e_\Omega - c_2 k_\Omega e_R \cdot e_\Omega \leq \tag{55}$$

$$-\left(k_\Omega - \frac{c_2}{\sqrt{2}} \Lambda_{pmax} tr[G]\right)\|e_\Omega\|^2 + c_2 k_R \|e_R\|^2 = -z_I^T W_{31}^p z_1$$

where $W_{31}^{p \in} \mathbb{R}^{2\times 2}$ *is defined in* (56).

$$W_{31} = \begin{bmatrix} c_2 k_R & -\dfrac{c_2 k_\Omega}{2} \\ -\dfrac{c_2 k_\Omega}{2} & k_\Omega - \dfrac{c_2}{\sqrt{2}} \Lambda_{max}^p tr[G] \end{bmatrix} \tag{56}$$

This implies that the errors $z_1 = [\|e_R\|, \|e_\Omega\|]^T$ asymptotically converge to zero.

H. Case (3). In this section, we present the proof for the asymptotic stability of the attitude tracking errors of the $p^{th}$ subsystem in the presence of modeling uncertainty and external disturbances. The control torques are generated according to $$u = -k_R e_R - k_\Omega e_\Omega - Y\hat{h} + \mu, \tag{57}$$

$$\dot{\hat{h}} = -\left(\nabla^2 \psi(\hat{h}_p)\right)^{-1} Y^T e_A,$$

$$\mu = -\left(\delta_R + \frac{\eta}{\|e_A\|}\right)\frac{e_A}{\|e_A\|},$$

$$e_A = e_\Omega + c_2 e_R$$

where $\eta$ is a small positive constant.

Proof. Consider the following Lyapunov candidate:

$$v_p = \frac{1}{2} e_\Omega^T H_p e_\Omega + k_R \Phi(R, R_d) + c_2 e_R \cdot H_p e_\Omega + d_\psi(h_p \| \hat{h}) \tag{58}$$

Differentiating $\mathcal{V}_p$ along the solutions of the system and employing (57), we obtain $$\dot{v}_p = e_\Omega^T H_p \dot{e}_\Omega + k_R e_R \cdot e_\Omega + c_2 \dot{e}_R \cdot H_p e_\Omega + c_2 e_R \cdot H_p \dot{e}_\Omega + \dot{d}_\psi(\cdot) =$$

$$-k_\Omega e_\Omega^T e_\Omega + e_\Omega^T Y(\hat{h}_p - h_p) + e_\Omega^T(\Delta + \mu) + c_2 C(R_d^T, R) e_\Omega \cdot H_p e_\Omega -$$

$$c_2 k_R e_R^T e_R + c_2 e_R \cdot Y(\hat{h}_p - h_p) + c_2 e_R^T(\Delta + \mu) - c_2 k_\Omega e_R \cdot e_\Omega + \dot{d}_\psi(\cdot) =$$

$$-k_\Omega e_\Omega^T e_\Omega + c_2 C(R_d^T, R) e_\Omega \cdot H_p e_\Omega - c_2 k_R e_R^T e_R +$$

$$e_A \cdot Y(\hat{h}_p - h_p) + e_A \cdot (\Delta + \mu) - c_2 k_\Omega e_R \cdot e_\Omega + \dot{d}_\psi(\cdot) \quad 65$$

Since $$\left\|C(R_d^T, R)\right\| \leq \frac{1}{2} tr[G],$$

we obtain:

$$\dot{v}_p = -k_\Omega e_\Omega^T e_\Omega - c_2 k_R e_R^T e_R + c_2 C(R_d^T,) e_\Omega \cdot H_p e_\Omega - c_2 k_\Omega e_R \cdot e_\Omega \leq \tag{59}$$

$$-\left(k_\Omega - \frac{c_2}{\sqrt{2}} \Lambda_{pmax} tr[G]\right)\|e_\Omega\|^2 -$$

$$c_2 k_R \|e_R\|^2 + c_2 k_\Omega \|e_R\|\|e_\Omega\| + e_A \cdot (\Delta + \mu)$$

The last term in above equation is bounded by:

$$e_A \cdot (\Delta + \mu) \leq \|e\|_A \delta_R - \left(\delta_R + \frac{\eta}{\|e_A\|}\right)\frac{e_A \cdot e_A}{\|e_A\|} \leq \eta \tag{60}$$

which implies $\dot{\mathcal{V}}_p$ bounded by:

$$\dot{v}_p \leq z_I^T W_{31}^p z_1 + \eta \tag{61}$$

Hence if $\eta$ is adaptively chosen such that $\eta \leq z_1(t)^T W_{31}^p z_1(t)$, the attitude errors are asymptotically stable. Here, we choose to employ a bounded disturbance for the model in order to decrease the control efforts (we define control effort as the magnitude of the control torques and thrust, as computed by the controller) and minimise discontinuity. Other discontinuous disturbance rejection laws can also be employed of the form:

$$\mu = -k_\mu \text{sign}(e_A)$$

at the expense of conservative and discontinuous control efforts, where $k_\mu = \delta_R + V$ for a small positive constant v and sign $(e_A)$ represents the sign of each element of the vector $e_A$.

I. Results.

This section describes the various case scenarios simulated to validate the proposed controller for the switched system.

1) Simulation Setup for FIG. 3: To validate Case 2 with no external disturbances, the inertia matrix ($H_p$) for the $p^{th}$ configuration is assumed to have the structure $H_p = H_p^0 + \Delta H_p$ with the nominal inertia matrix, $H_p^0$, and uncertainty $\Delta H_p$. The values for $H_p^0$ are obtained from previously-obtained formulations for two configurations 1 and 2 as corresponding to $l_1 = 0.2$ and $l_2 = 0.1$. The rest of the parameters are set to $M = 1.4$ kg, $k_R = 0.0424$, $k_\Omega = 0.0296$. The initial guess in the inertia parameters for the estimator are chosen as the nominal matrix $H_p^0$, more specifically:

$$\hat{H}_1(0) = \begin{bmatrix} 0.0023 & -0.0006 & 0.0010 \\ -0.0006 & 0.0172 & 0 \\ 0.0010 & 0 & 0.0181 \end{bmatrix}, \tag{62}$$

$$\hat{H}_2(0) = \begin{bmatrix} 0.0014 & -0.0001 & 0.0005 \\ -0.0001 & 0.0052 & 0 \\ 0.0005 & 0 & 0.0053 \end{bmatrix}$$

with the uncertainty set to:

$$\Delta H_1 = \Delta H_2 = \text{diag}[0.01, 0.01, 0.02]$$

2) Comparison against Conventional Robust Controller: Here, we present the comparison between the performances of the proposed adaptive controller in Section IV-B and a conventional robust controller that accounts for parameter-varying uncertainty in inertia by assuming an upper bound. For this case, we retain the nominal matrix from (62):

$$H_1^0 = \hat{H}_1(0), H_2^0 = \hat{H}_2(0)$$

Figure 5A:
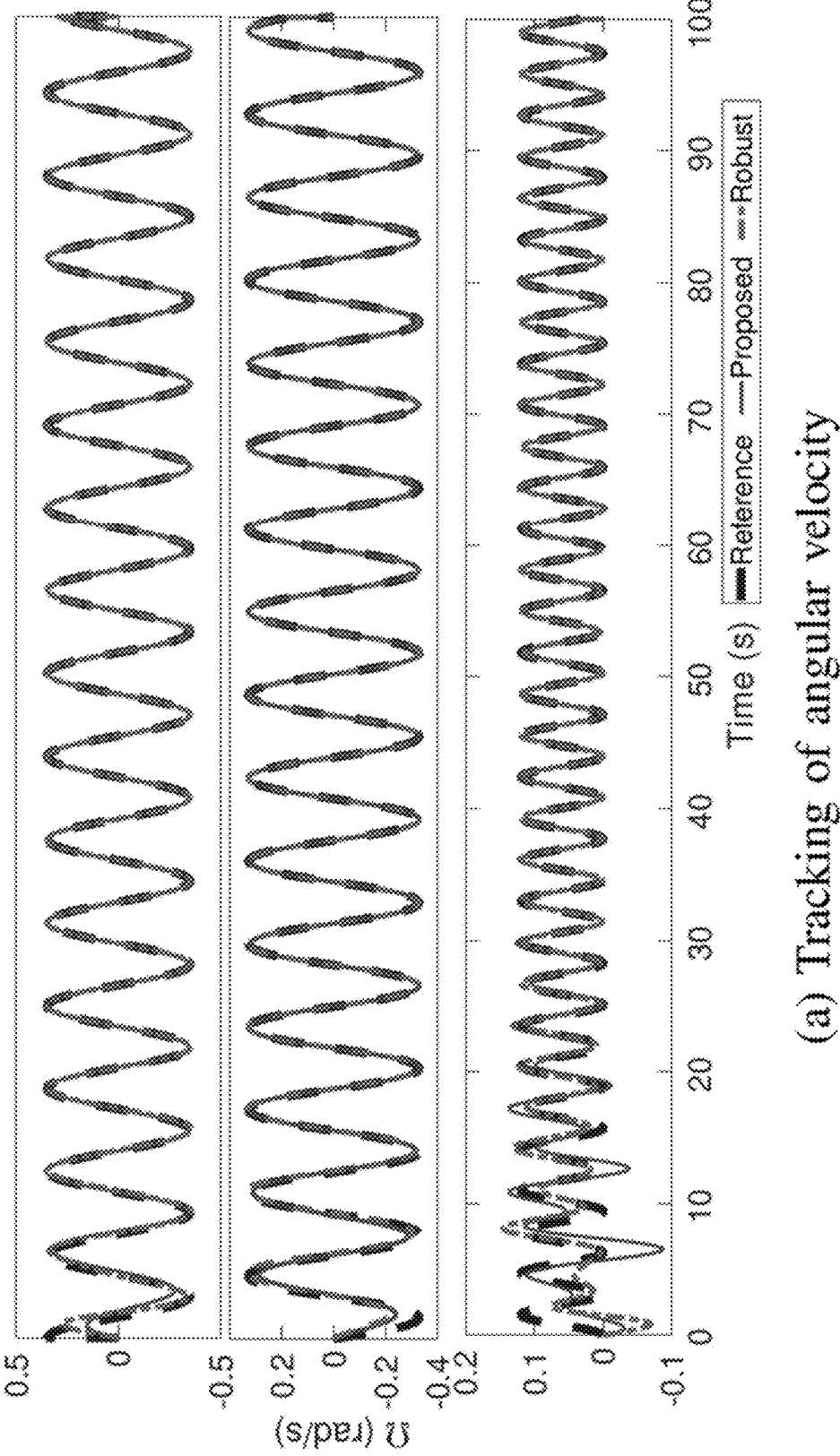
FIGS. 5A and 5B are a pair of graphical representations showing performance of the adaptive attitude controller of FIGS. 1A and 1B compared with a conventional robust controller without disturbances, when the configuration switches from 1 to 2 at t=30 s and from 2 to 1 at t=60 s, where the uncertainty bounds assumed for the conventional robust controller are constant across the two configurations and are too high for configuration 2 leading to high control efforts (magnitude of control torques) (for both configurations 1 and 2) and chattering, while the adaptive attitude controller demonstrates low control effort.
Figure 5B:
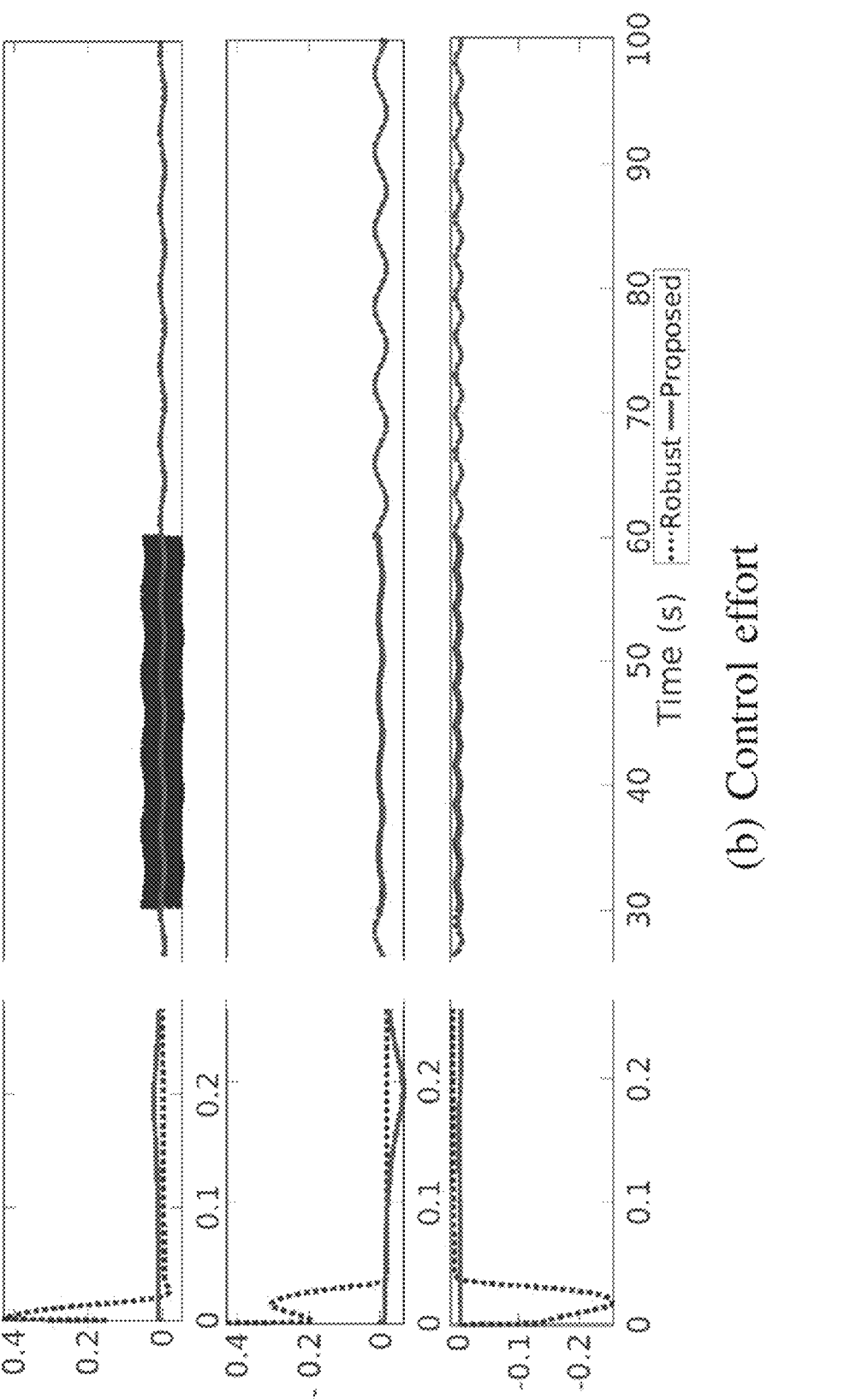
Figure 6A:
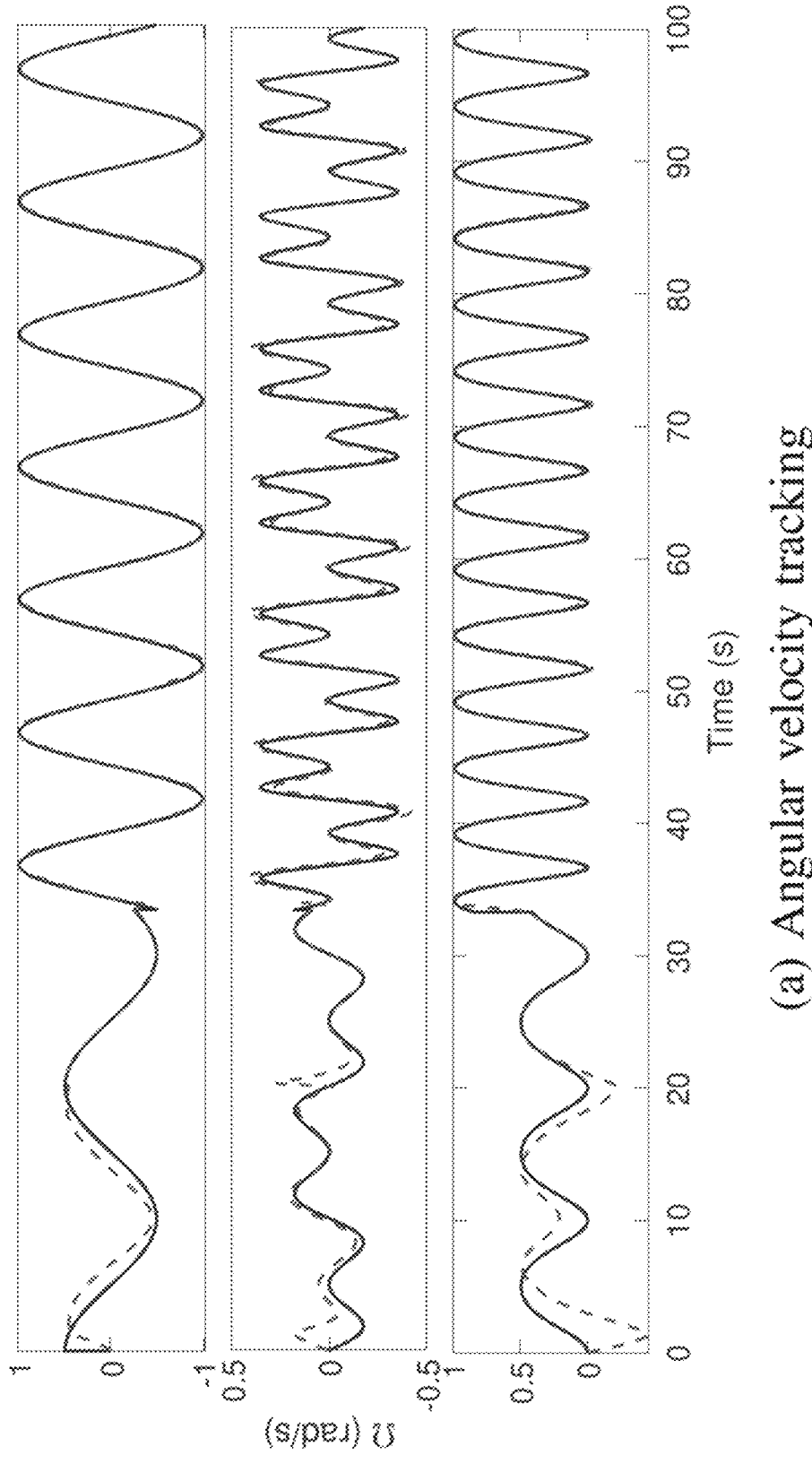
FIGS. 6A-6D are a series of graphical representations showing performance of the adaptive attitude controller of FIGS. 1A and 1B in the presence of unmodeled aerodynamic disturbances, assumed as bounded uncertainties, where tracking of angular velocity in FIG. 6A, the attitude errors in FIG. 6B, and the inertia estimates in FIG. 6C show that the zero equilibrium of the attitude tracking error is reached asymptotically, and where
Figure 6B:
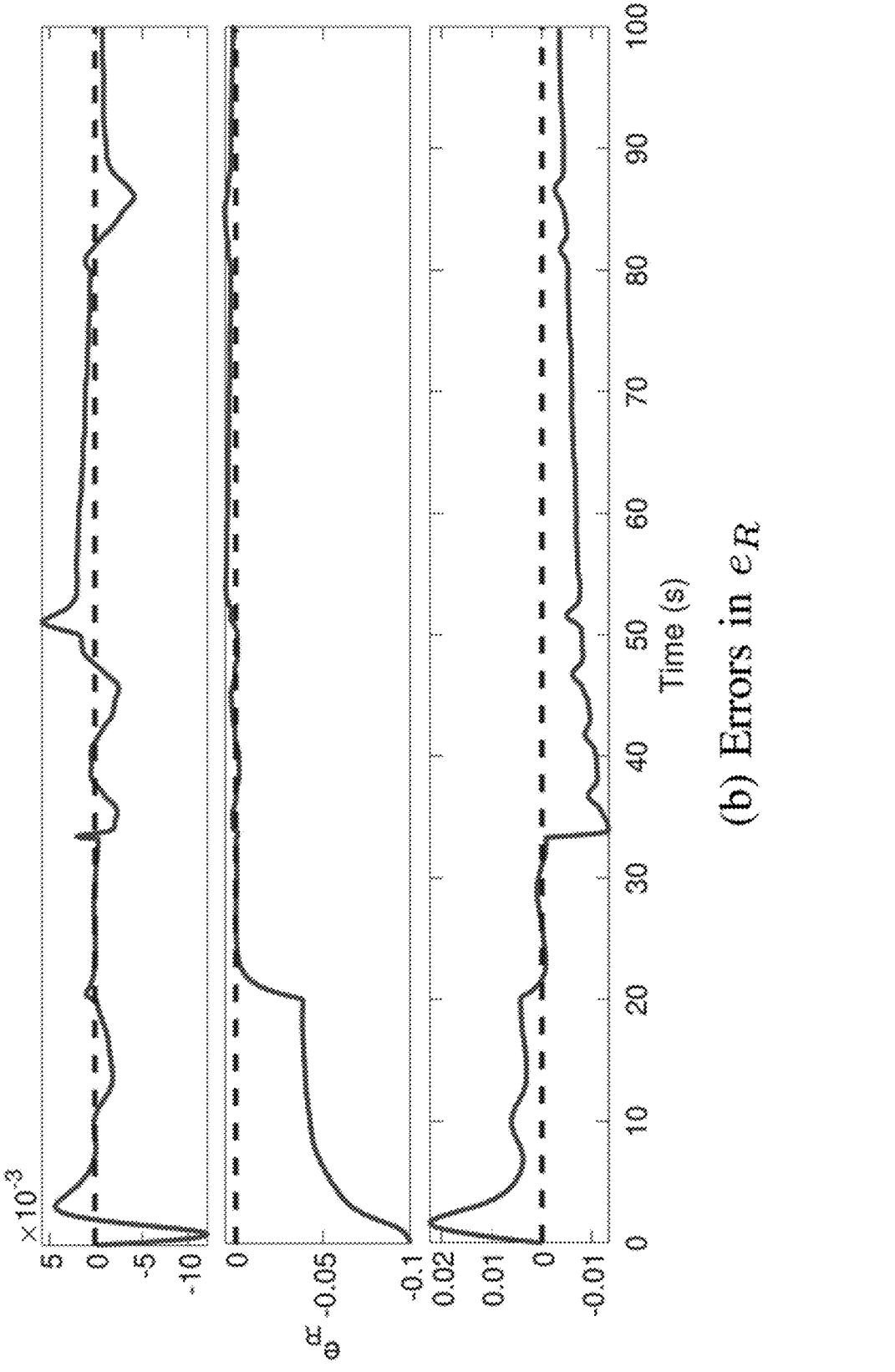
Figure 6C:
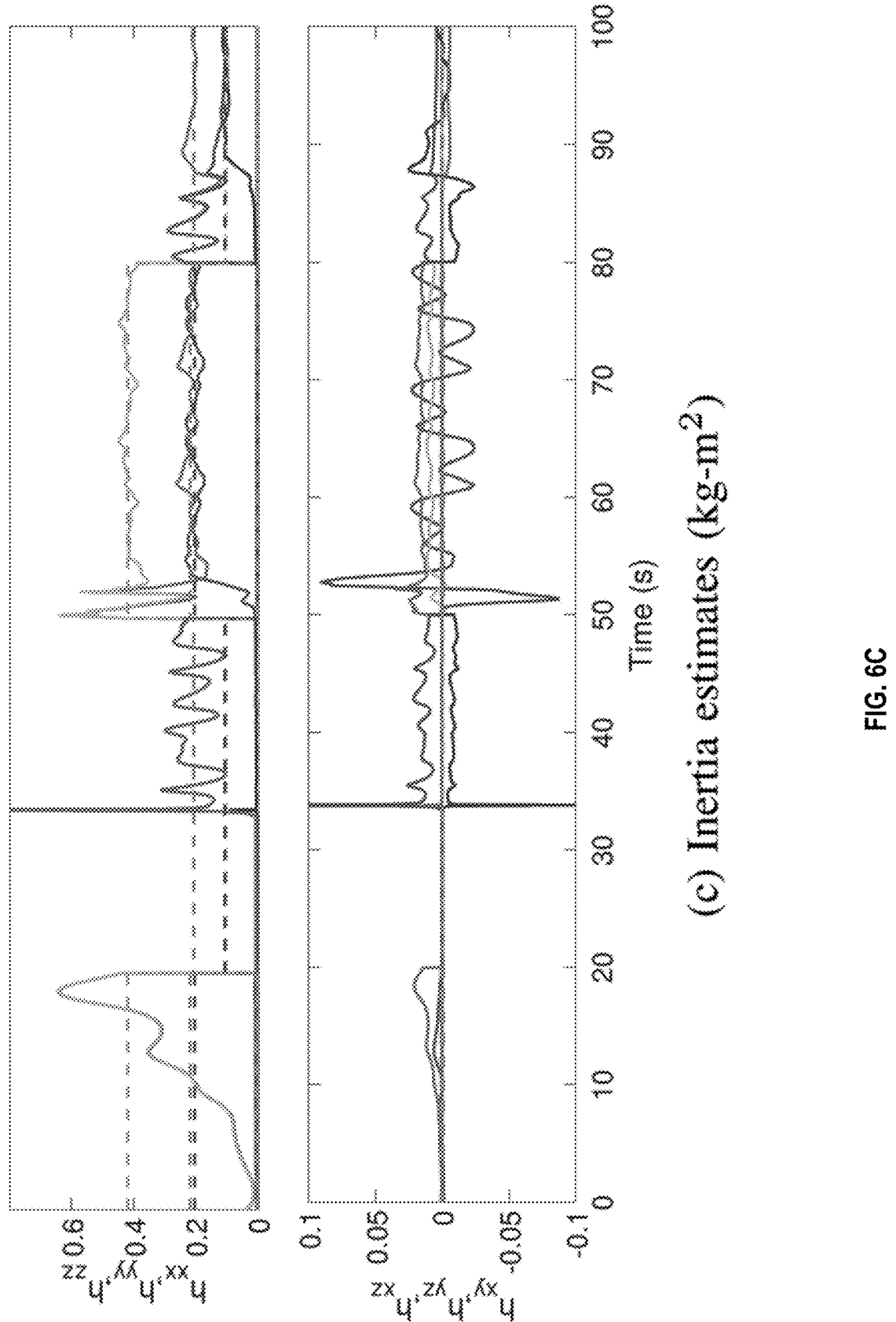
Figure 6D:
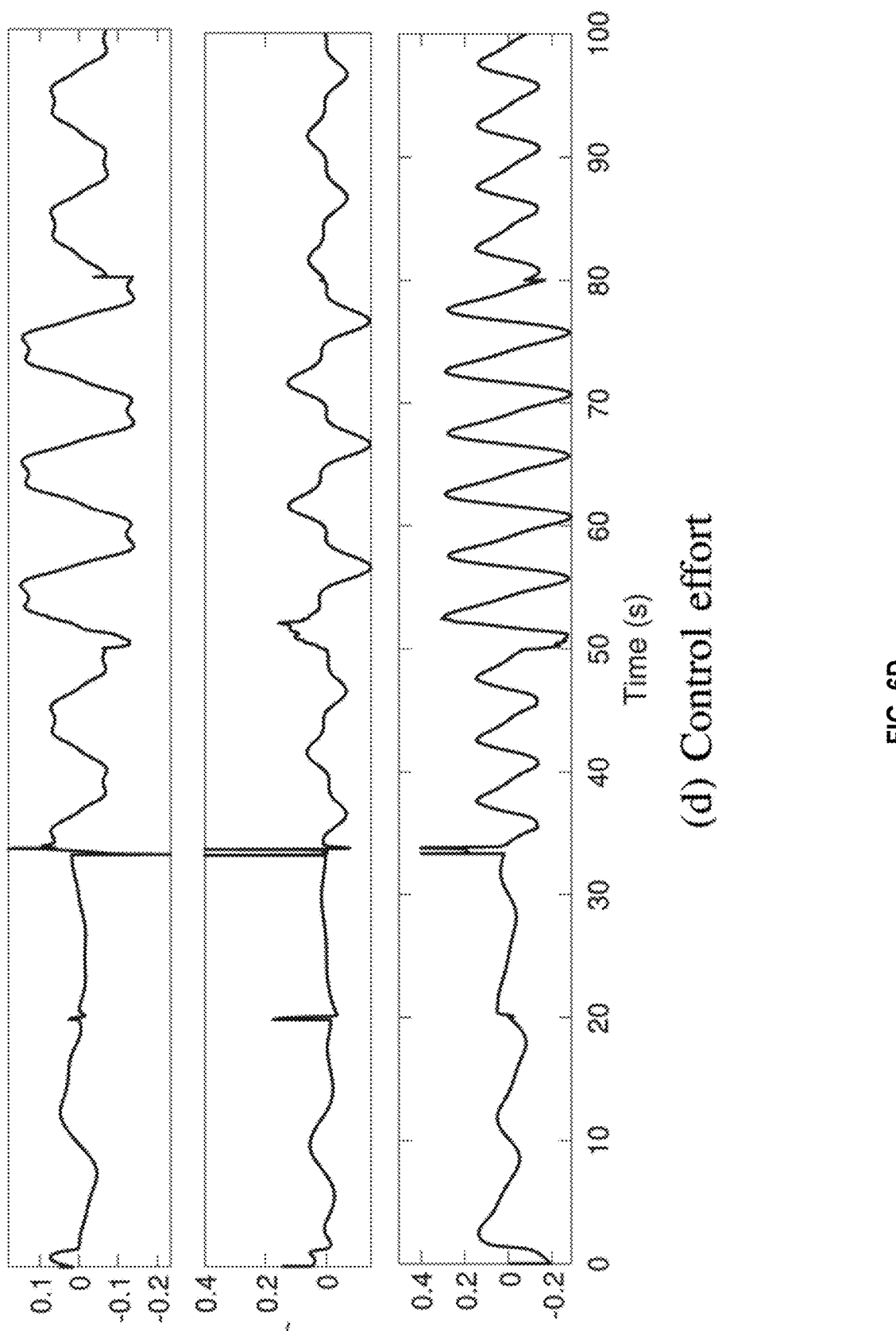
Figure 7A:
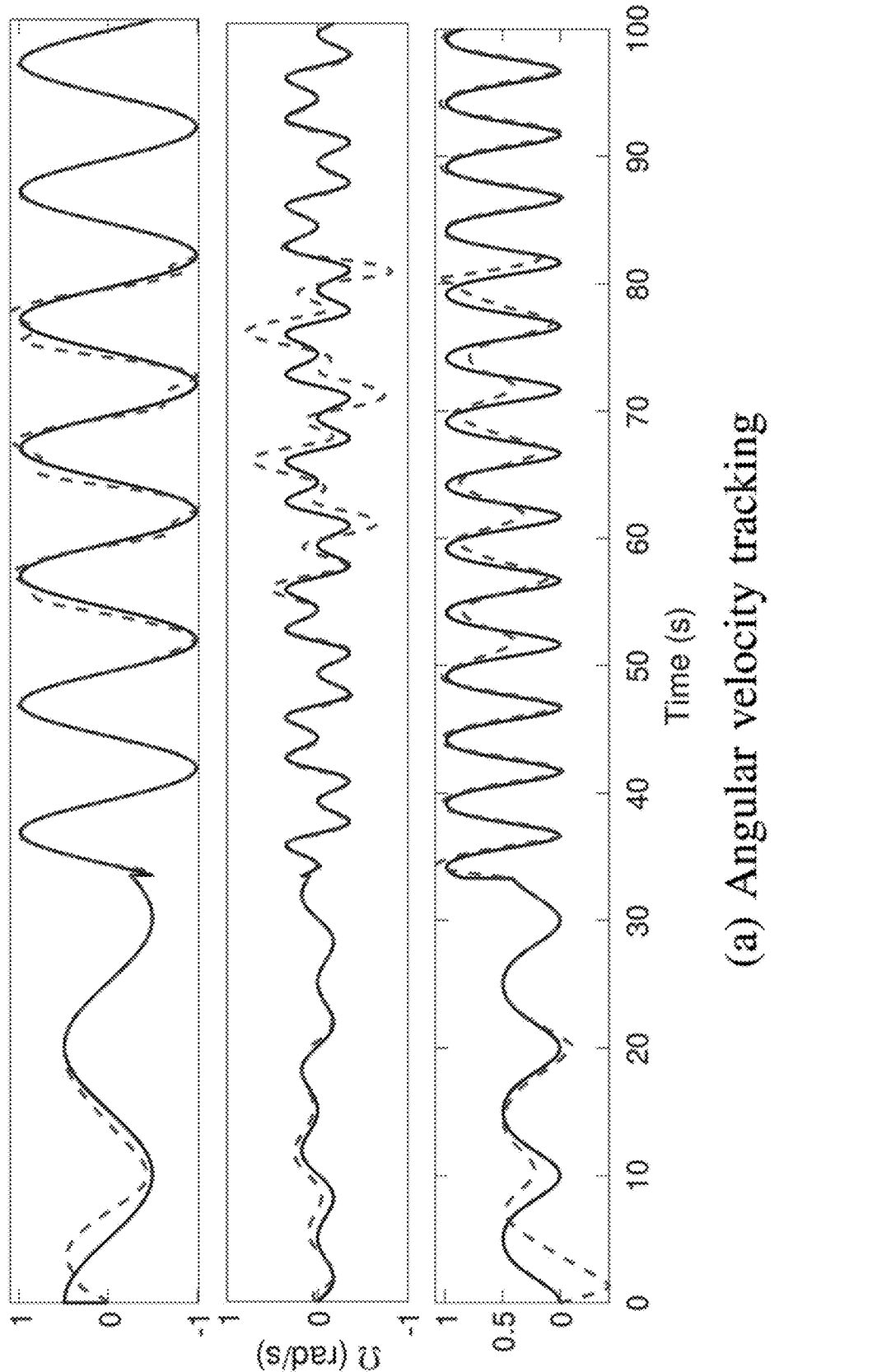
FIGS. 7A-7C are a series of graphical representations showing performance of a conventional robust controller in the presence of unmodeled aerodynamic disturbances, assumed as bounded uncertainties, showing tracking of angular velocity in FIG. 7A, the attitude errors in FIG. 7B, and control effort in FIG. 7C, where the bound assumed is low for a first configuration which leads to tracking performance deterioration.
Figure 7B:
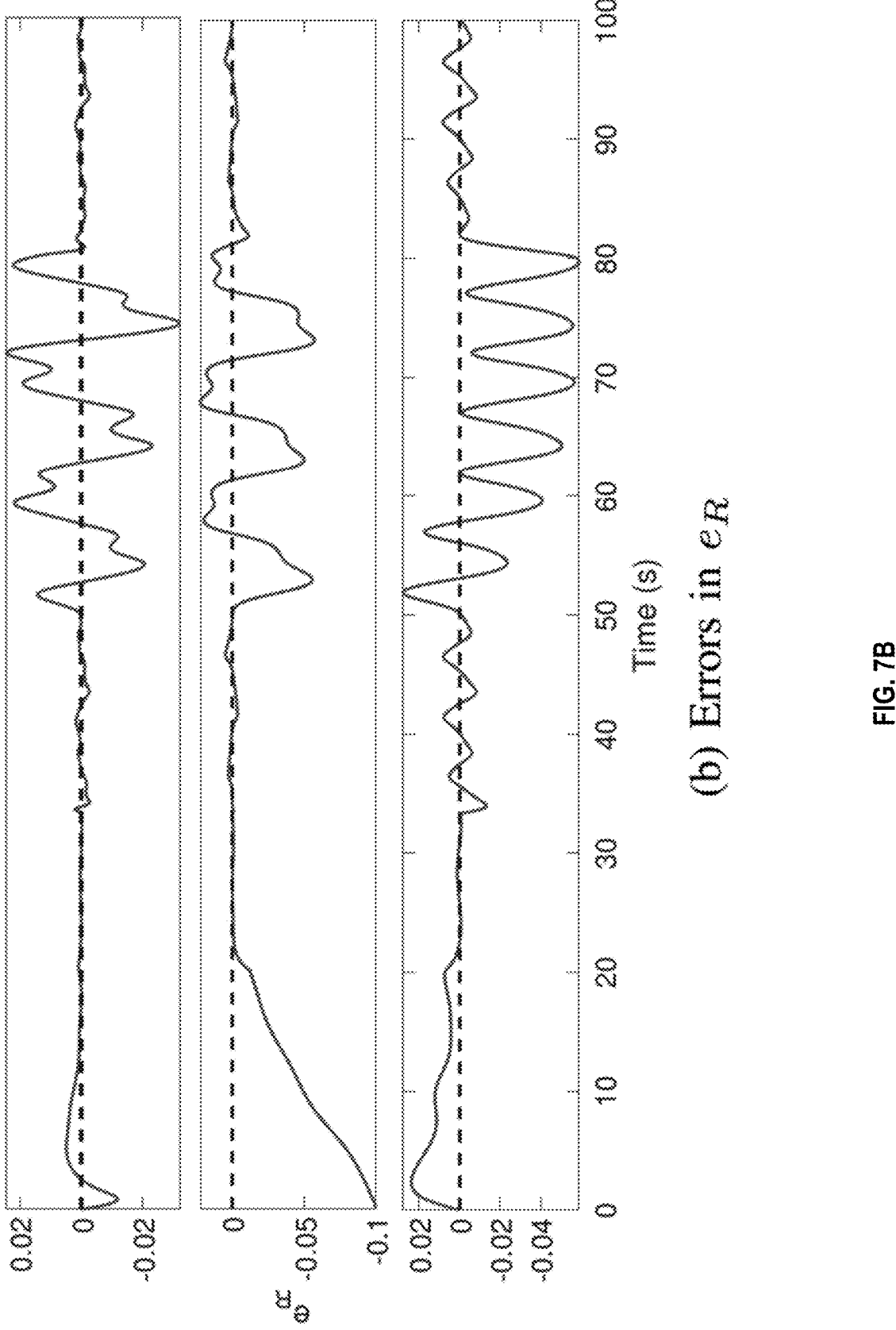
Figure 7C:
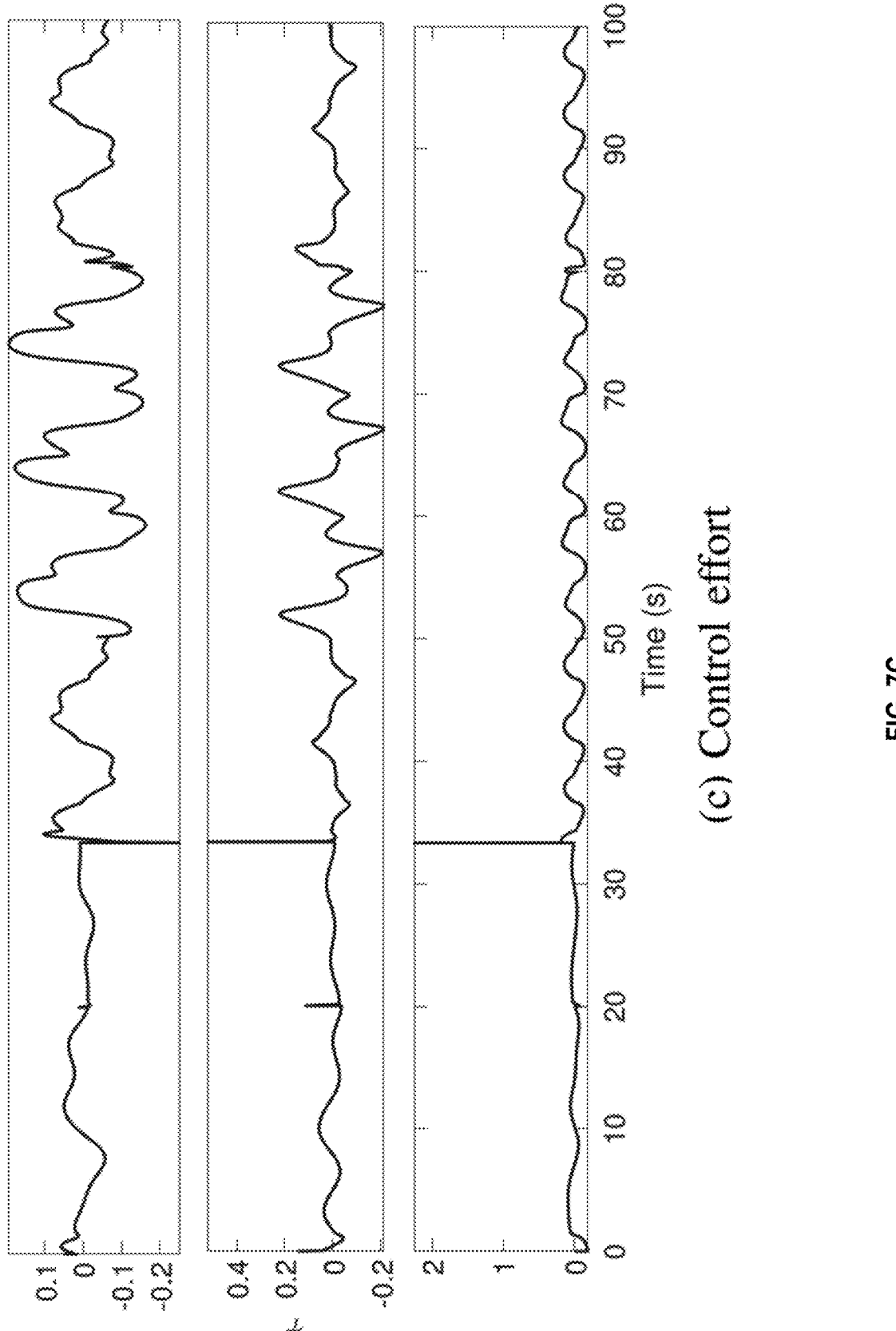

However, the actual uncertainty in parameters for this case are chosen as $$\Delta H_1 = \text{diag}[0.2, 0.2, 0.4], \Delta H_2 = [0.1, 0.1, 0.2]$$

with the assumed bound as ($\delta_R$=0.5) for the robust controller. The results for angular velocity tracking and the corresponding control efforts are seen in FIGS. 5A and 5B. Note that control effort in this case is defined as the magnitude of the control torques and thrust, as computed by the controller. From FIGS. 5A and 5B, it is seen that the performance of the proposed adaptive controller is comparable to that of the robust controller, however with low control efforts. Further, the robust controller uncertainty assumed ($\delta_R$=0.5) is too high for the subsystem 2 which leads to chattering as shown in FIG. 5B.

3) Results for Proposed Controller in Sec. IV-C: Referring to FIGS. 6A-6D and 7A-7C, since the adaptive controllers can be unstable even for a slight disturbance, we simulate the case when there is disturbance added to the system with $\Delta(t)=0.1[0 \ \sin \ (t) \ \cos \ (t)]^T$. Remaining parameters are retained from Section VII-1.2 above. The proposed robust adaptive controller in (57), is simulated with low gains as above and low uncertainty bounds assumed at $\delta_R$=0.2 and $\eta$=0.0003. We also employ a varying frequency reference to ensure that the tracking errors are high after the quadrotor switches to a different subsystem to facilitate convergence of the inertia estimation errors.

The tracking of the angular velocity and the attitude errors $e_R$ show that the zero equilibrium of the attitude tracking error is reached asymptotically with the proposed adaptive controller augmented with the robust term. The inertia estimates also converge to the true inertia values (although this is not guaranteed, as mentioned due to the lack of persistence of excitation). The logarithmic nature of the estimation error leads to a longer delay in the tracking of the inertia parameters for subsystem 2 as shown by the maroon solid curve in FIG. 6C. In future work, we would like to extend our analysis to improve the convergence rate and robustness in the presence of any matched input uncertainties.

Furthermore, from FIGS. 6A-7C, it is seen that the proposed controller performs better against the conventional robust controller by leading to improved tracking performance as shown in FIGS. 6A-6D, thereby validating Proposition 12. The net bounded uncertainty ($\delta_R$) assumed is lower than the value coupled with the uncertainties in inertia for the conventional robust controller case. Hence the robust controller does not perform well in this case scenario. If the bounds assumed are too high, it may lead to chattering as shown in the FIG. 5B.

VIII. Computer-Implemented System

FIG. 8 is a schematic block diagram of an example computing device 300 that may be used with one or more embodiments described herein, e.g., as a component of the quadrotor and implementing aspects of MJT planner 110, the position controller 120, the adaptive attitude controller 130, the control allocation module 140 of the system 100 shown in FIGS. 1A and 1B. The computing device 300 may be in communication with the sensor(s) 210 and/or actuation elements 220 of the system 100.

Computing device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches). Memory 340 can include instructions executable by the processor 320 that, when executed by the processor 320, cause the processor 320 to implement aspects of the systems and the methods outlined herein.

Processor 320 comprises hardware elements or logic adapted to execute the software programs (e.g., instructions) and manipulate data structures 345. An operating system 342, portions of which are typically resident in memory 340 and executed by the processor, functionally organizes computing device 300 by, inter alia, invoking operations in support of software processes and/or services executing on the device. These software processes and/or services may include FQr controller processes/services 390, which can include aspects of the methods and/or implementations of various modules described herein. Note that while FQr controller processes/services 390 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the FQr controller processes/services 390 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
a vehicle including a processor in communication with a memory and a sensor, the memory including instructions executable by the processor to:
   access a reference trajectory including a reference attitude for a vehicle, the vehicle being operable for switching between a plurality of geometric configurations at a switching time;
   determine, based on a set of attitude information obtained from the sensor, an attitude tracking error with respect to the reference attitude;
   determine a minimum dwell time that restricts the switching time to accommodate modeling uncertainties associated with switching between geometric configurations, the minimum dwell time incorporating a ratio of the attitude tracking error; and
   update, based on the attitude tracking error, the reference trajectory to reflect an adapted reference trajectory including an adapted reference attitude based on: the minimum dwell time, a settling time associated with attitude tracking stabilization for the vehicle under a geometric configuration of the plurality of geometric configurations, and the reference trajectory.

2. The system of claim 1, the minimum dwell time incorporating a ratio between a minimum eigenvalue of a first matrix and a maximum eigenvalue of a second matrix, the first matrix and the second matrix being associated with pre-determined values including an augmenting constant, a set of tuning parameters, an estimated minimum eigenvalue of an inertia matrix for the geometric configuration of the vehicle, and an estimated maximum eigenvalue of the inertia matrix for the geometric configuration of the vehicle.

3. The system of claim 1, the memory further including instructions executable by the processor to:
generate, based on the adapted reference trajectory, a mode switching signal to transition the vehicle between a first geometric configuration and a second geometric configuration at the switching time, the switching time being selected based on: the minimum dwell time, the settling time, a position of the vehicle in view of the adapted reference trajectory, and a velocity of the vehicle in view of the adapted reference trajectory.

4. The system of claim 1, the adapted reference trajectory being generated based on a set of trajectory boundary conditions that incorporate:

a target position of an entrance of a passageway where the vehicle is expected to reach over a time interval that is greater than the settling time and the minimum dwell time; and
a target velocity for the vehicle to travel through the passageway over the time interval that is greater than the settling time and the minimum dwell time.

5. The system of claim 1, the memory further including instructions executable by the processor to:
determine a control torque value based on the attitude tracking error, the control torque value incorporating a robust control term that accommodates unknown external disturbances that affect attitude control of the vehicle, the robust control term incorporating an augmented tracking error which incorporates the attitude tracking error and an augmenting constant associated with the geometric configuration, the augmenting constant being selected to ensure that attitude tracking error for each configuration of the vehicle converge to zero; and
generate an actuation signal for application to one or more actuation elements of the vehicle based on the control torque value.

6. The system of claim 5, the augmenting constant having a value that is less than a minimum of a set of pre-determined constants based on the geometric configuration of the vehicle, which can be determined using a set of tuning parameters for the geometric configuration of the vehicle, an estimated minimum eigenvalue of an inertia matrix for the geometric configuration of the vehicle, and an estimated maximum eigenvalue of the inertia matrix for the geometric configuration of the vehicle.

7. The system of claim 5, the robust control term incorporating a small positive constant which is adaptively chosen to be less than a scalar value which incorporates the attitude tracking error and a third matrix associated with the geometric configuration;
the third matrix incorporating: the augmenting constant, a set of tuning parameters for the geometric configuration of the vehicle, and an estimated maximum eigenvalue of an inertia matrix for the geometric configuration of the vehicle.

8. The system of claim 5, the robust control term incorporating an estimated upper bound on external disturbances with respect to attitude dynamics for the vehicle.

9. A system, comprising:
a vehicle including a processor in communication with a memory and a sensor, the memory including instructions executable by the processor to:
   access a reference trajectory including a reference attitude for a vehicle, the vehicle being operable for switching between a plurality of geometric configurations at a switching time;
   determine, based on a set of attitude information obtained from the sensor, an attitude tracking error with respect to the reference attitude; and
   determine a control torque value based on the attitude tracking error, the control torque value incorporating a robust control term that accommodates unknown external disturbances that affect attitude control of the vehicle, the robust control term incorporating an augmented tracking error which incorporates the attitude tracking error and an augmenting constant associated with a geometric configuration of the plurality of geometric configurations, the augmenting constant being selected to ensure that attitude tracking error for the geometric configuration of the vehicle converges to zero.

10. The system of claim 9, the memory further including instructions executable by the processor to:

generate an actuation signal for application to one or more actuation elements of the vehicle based on the control torque value by providing the control torque value as input to a control allocation matrix associated with the geometric configuration that maps the control torque value to the actuation signal.

11. The system of claim 9, the augmenting constant having a value that is less than a minimum of a set of pre-determined constants based on the geometric configuration of the vehicle, which can be determined using a set of tuning parameters for the geometric configuration of the vehicle, an estimated minimum eigenvalue of an inertia matrix for the geometric configuration of the vehicle, and an estimated maximum eigenvalue of the inertia matrix for the geometric configuration of the vehicle.

12. The system of claim 11, the set of tuning parameters being approximated through a simulation process.

13. The system of claim 11, the estimated minimum eigenvalue of the inertia matrix for the geometric configuration of the vehicle being approximated through a simulation process, and the estimated maximum eigenvalue of the inertia matrix for the geometric configuration of the vehicle being approximated through a simulation process.

14. The system of claim 9, the robust control term incorporating a small positive constant which is adaptively chosen to be less than a scalar value which incorporates the attitude tracking error and a third matrix associated with the geometric configuration;

the third matrix incorporating: the augmenting constant, a set of tuning parameters for the geometric configuration of the vehicle, and an estimated maximum eigenvalue of an inertia matrix for the geometric configuration of the vehicle.

15. The system of claim 9, the robust control term incorporating an estimated upper bound on external disturbances with respect to attitude dynamics for the vehicle.

16. The system of claim 15, the estimated upper bound on disturbances being approximated through a simulation process.

17. The system of claim 9, the memory further including instructions executable by the processor to:

determine a minimum dwell time that restricts the switching time to accommodate modeling uncertainties associated with switching between geometric configurations, the minimum dwell time incorporating a ratio of the attitude tracking error; and update, based on the attitude tracking error, the reference trajectory to reflect an adapted reference trajectory including an adapted reference attitude based on: the minimum dwell time, a settling time associated with attitude tracking stabilization for the vehicle under the geometric configuration, and the reference trajectory.

18. The system of claim 17, the adapted reference trajectory being generated based on a set of trajectory boundary conditions that incorporate:

a target position of an entrance of a passageway where the vehicle is expected to reach over a time interval that is greater than the settling time and the minimum dwell time; and a target velocity for the vehicle to travel through the passageway over the time interval that is greater than the settling time and the minimum dwell time.

19. The system of claim 17, the minimum dwell time incorporating a ratio between a minimum eigenvalue of a first matrix and a maximum eigenvalue of a second matrix, the first matrix and the second matrix being associated with pre-determined values including the augmenting constant, a set of tuning parameters, an estimated minimum eigenvalue of an inertia matrix for the geometric configuration of the vehicle, and an estimated maximum eigenvalue of the inertia matrix for the geometric configuration of the vehicle.

20. The system of claim 17, the memory further including instructions executable by the processor to:

generate, based on the adapted reference trajectory, a mode switching signal to transition the vehicle between a first geometric configuration and a second geometric configuration at the switching time, the switching time being selected based on: the minimum dwell time, the settling time, a position of the vehicle in view of the adapted reference trajectory, and a velocity of the vehicle in view of the adapted reference trajectory.

* * * * *